US011601968B2

(12) United States Patent
Wang et al.

(10) Patent No.: US 11,601,968 B2
(45) Date of Patent: Mar. 7, 2023

(54) SPLITTING AND CONCATENATING OF MEDIA ACCESS CONTROL (MAC) PROTOCOL DATA UNITS (PDUS) FOR DIRECT TRANSPORT BLOCK (TB) FORWARDING IN RELAYING OPERATIONS

(71) Applicant: QUALCOMM Incorporated, San Diego, CA (US)

(72) Inventors: Hua Wang, Basking Ridge, NJ (US); Sony Akkarakaran, Poway, CA (US); Tao Luo, San Diego, CA (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 158 days.

(21) Appl. No.: 17/127,658

(22) Filed: Dec. 18, 2020

(65) Prior Publication Data

US 2022/0201739 A1 Jun. 23, 2022

(51) Int. Cl.
*H04W 72/04* (2009.01)
*H04W 72/14* (2009.01)
(Continued)

(52) U.S. Cl.
CPC .......... *H04W 72/14* (2013.01); *H04B 7/0632* (2013.01); *H04L 1/1819* (2013.01); *H04L 5/0055* (2013.01); *H04W 76/27* (2018.02); *H04W 80/02* (2013.01); *H04W 92/18* (2013.01)

(58) Field of Classification Search
CPC ..... H04W 72/14; H04W 76/27; H04W 80/02; H04W 92/18; H04B 7/0632;
(Continued)

(56) References Cited

U.S. PATENT DOCUMENTS

2009/0097433 A1* 4/2009 Shen ................. H04B 7/155
370/315
2011/0110290 A1* 5/2011 Erkip ................. H04B 7/026
370/315
(Continued)

FOREIGN PATENT DOCUMENTS

WO 2017039735 A1 3/2017

OTHER PUBLICATIONS

International Search Report and Written Opinion—PCT/US2021/072024—ISA/EPO—dated Feb. 18, 2022.
(Continued)

*Primary Examiner* — Mahbubul Bar Chowdhury
(74) *Attorney, Agent, or Firm* — Patterson & Sheridan, LLP

(57) ABSTRACT

Certain aspects of the present disclosure provide techniques for direct TB forwarding. In aspects, a relay node receives, from a source node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node, receives, from the source node, control information for one or more data channels configuring: one DL grant and two or more SL grants, or two or more DL grants and one SL grant, decoding one or more TBs based, at least in part, on the control information, and directly forwards the one or more TBs to the one or more destination nodes based on the indication and the control information.

19 Claims, 16 Drawing Sheets

(51) Int. Cl.
  *H04W 76/27* (2018.01)
  *H04B 7/06* (2006.01)
  *H04L 1/1812* (2023.01)
  *H04L 5/00* (2006.01)
  *H04W 80/02* (2009.01)
  *H04W 92/18* (2009.01)

(58) Field of Classification Search
  CPC ... H04L 1/1819; H04L 1/0045; H04L 1/0003; H04L 1/0009; H04L 1/1825; H04L 1/1893; H04L 1/0026; H04L 5/0055; H04L 2001/0097
  See application file for complete search history.

(56) References Cited

U.S. PATENT DOCUMENTS

| | | | | |
|---|---|---|---|---|
| 2012/0281549 A1* | 11/2012 | Yu | ................. | H04B 7/15528 370/242 |
| 2013/0286932 A1* | 10/2013 | Zhang | ................. | H04B 7/155 370/315 |
| 2014/0177514 A1* | 6/2014 | Azizi | ................. | H04B 7/15528 370/315 |
| 2018/0035276 A1* | 2/2018 | Kang | ................. | H04W 48/08 |
| 2020/0288511 A1 | 9/2020 | Burbidge et al. | | |

OTHER PUBLICATIONS

"Specification of the 3GPP 5G Radio Interface Technology—SRIT", 3GPP Draft, RP-193066.ZIP, M2020SPECS_SYNOPSIS, 3rd Generation Partnership Project (3GPP), Mobile Competence Centre, 650, Route Des Lucioles, F-06921 Sophia-Antipolis Cedex, France, Dec. 5, 2019 (Dec. 5, 2019), XP051837351, 38 Pages, Retrieved from the Internet: URL: https://ftp.3gpp.org/tsg_ran/TSG_RAN/TSGR_86/LSin/RP-193066.zipM2020specs_synopsis.zip_M2020specs_synopsis.docx [Retrieved on Dec. 5, 2019] figure 1. 21 section 1.4.5.6.

* cited by examiner

SPLITTING AND CONCATENATING OF MEDIA ACCESS CONTROL (MAC) PROTOCOL DATA UNITS (PDUS) FOR DIRECT TRANSPORT BLOCK (TB) FORWARDING IN RELAYING OPERATIONS

BACKGROUND

Field of the Disclosure

Aspects of the present disclosure relate to wireless communications, and more particularly, to techniques for direct transport block (TB) forwarding in relaying operations.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, 5G NB, next generation NodeB (gNB or gNodeB), transmission reception point (TRP), etc.). A BS or DU may communicate with a set of UEs on downlink channels (e.g., for transmissions from a BS or DU to a UE) and uplink channels (e.g., for transmissions from a UE to BS or DU).

These multiple access technologies have been adopted in various telecommunication standards to provide a common protocol that enables different wireless devices to communicate on a municipal, national, regional, and even global level. NR (e.g., new radio or 5G) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. These improvements should be applicable to other multi-access technologies and the telecommunication standards that employ these technologies.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include improved communications between access points and stations in a wireless network.

Certain aspects of the subject matter described in this disclosure provide a method for wireless communication by a relay node. The method generally includes receiving, from a source node, an indication to directly forward one or more transport blocks (TBs) to one or more destination nodes, wherein directly forwarding includes transmitting a TB of the one or more TBs to the one or more destination nodes through only a Physical (PHY) layer and a hybrid automatic repeat request (HARD) portion of a Media Access Control (MAC) layer in a protocol stack of the relay node. The method generally includes receiving, from the source node, control information for one or more data channels configuring one downlink (DL) grant and two or more sidelink (SL) grants or two or more DL grants and one SL grant. The method generally includes decoding one or more TBs based, at least in part, on the control information. The method generally includes directly forwarding the one or more TBs to the one or more destination nodes based, at least in part, on the indication and the control information.

Certain aspects of the subject matter described in this disclosure provide a method for wireless communication by a source node. The method generally includes transmitting, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node. The method generally includes transmitting, to the relay node, control information for one or more data channels configuring one DL grant and two or more SL grants or two or more DL grants and one SL grant.

Certain aspects of the subject matter described in this disclosure can be implemented in an apparatus for wireless communication by a relay node. The apparatus generally includes: a memory and at least one processor coupled to the memory, the memory and the at least one processor being configured to receive, from a source node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node, receive, from the source node, control information for one or more data channels configuring one DL grant and two or more SL grants or two or more DL grants and one SL grant, decode one or more TBs based, at least in part, on the control information, and directly forward the one or more TBs to the one or more destination nodes based, at least in part, on the indication and the control information.

Certain aspects of the subject matter described in this disclosure can be implemented in an apparatus for wireless communication by a source node. The apparatus generally includes a memory and at least one processor coupled to the memory, the memory and the at least one processor being configured to transmit, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node and transmit, to the relay node, control information for one or more data channels configuring one DL grant and two or more SL grants or two or more DL grants and one SL grant.

Certain aspects of the subject matter described in this disclosure can be implemented in an apparatus for wireless communication by a relay node. The apparatus generally includes means for receiving, from a source node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node, means for receiving, from the source node, control information for one or more data channels configuring one DL grant and two or more SL grants or two or more DL grants and one SL grant, means for decoding one or more TBs based, at least in part, on the control information, and means for directly forward the one or more TBs to the one or more destination nodes based, at least in part, on the indication and the control information.

Certain aspects of the subject matter described in this disclosure can be implemented in an apparatus for wireless communication by a relay node. The apparatus generally includes means for transmitting, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node and means for transmitting, to the relay node, control information for one or more data channels configuring one DL grant and two or more SL grants or two or more DL grants and one SL grant.

Certain aspects of the subject matter described in this disclosure can be implemented in a computer-readable medium having instructions stored thereon to cause a relay node to receive, from a source node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node, receive, from the source node, control information for one or more data channels configuring one DL grant and two or more SL grants or two or more DL grants and one SL grant, decode one or more TBs based, at least in part, on the control information, and directly forward the one or more TBs to the one or more destination nodes based, at least in part, on the indication and the control information.

Certain aspects of the subject matter described in this disclosure can be implemented in a computer-readable medium having instructions stored thereon to cause a source node to transmit, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node and transmit, to the relay node, control information for one or more data channels configuring one DL grant and two or more SL grants or two or more DL grants and one SL grant.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
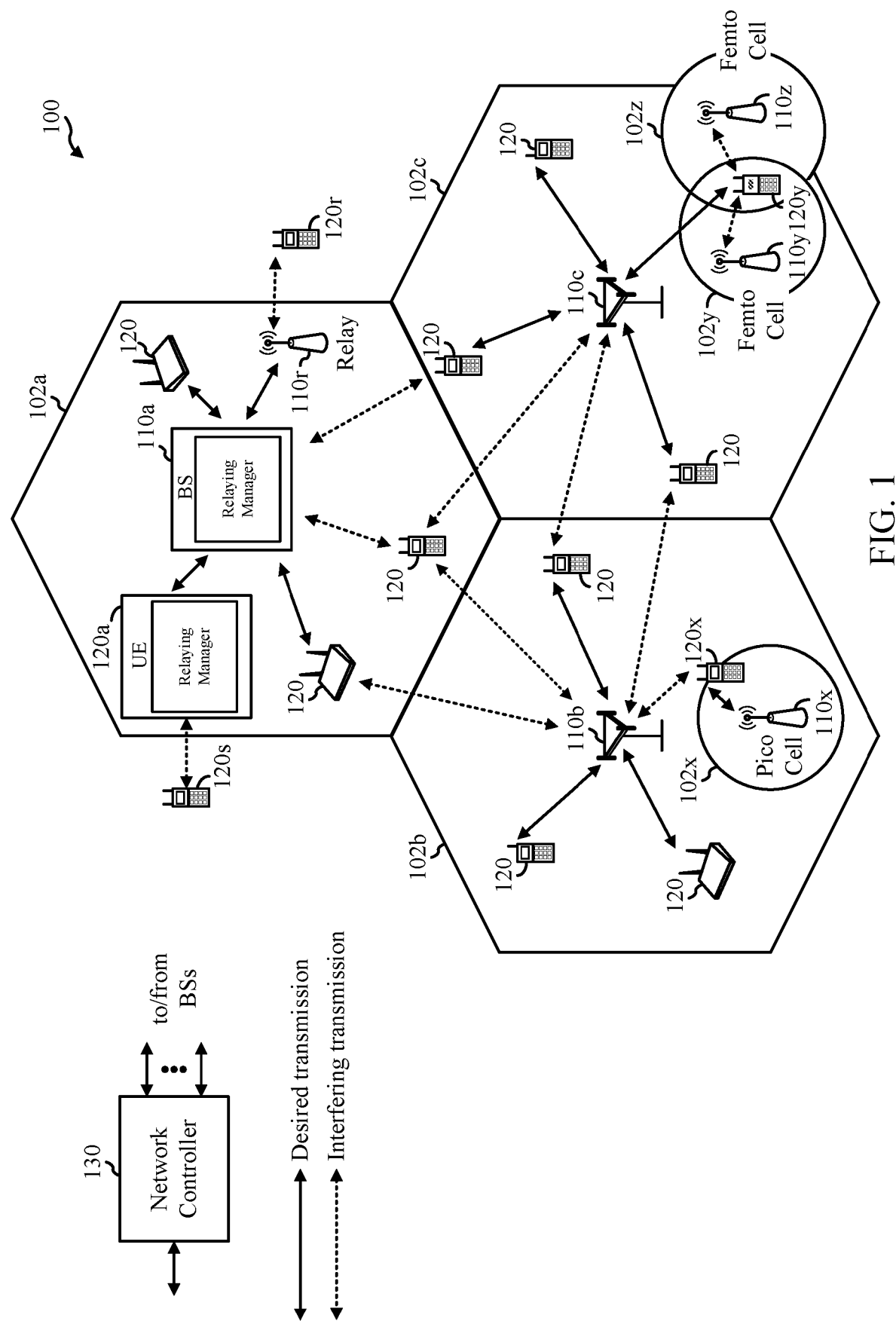
FIG. 1 is a block diagram conceptually illustrating an example telecommunications system, in accordance with certain aspects of the present disclosure.

Aspects of the present disclosure provide apparatus, methods, processing systems, and computer readable mediums for relaying operations. As will be described herein, direct transport block (TB) forwarding may be enabled in relaying operations wherein a TB is transmitted to a destination node without going through the entire protocol stack of the relay node. Accordingly, a TB may be transmitted to a destination node through only a Physical (PHY) layer and a portion of the Media Access Control (MAC) layer. In aspects of the present disclosure, the TB is forwarded through the PHY layer and the hybrid automatic repeat request (HARQ) portion of the MAC layer in a protocol stack of a relay node.

In some aspects, a source node may transmit two or more packets, in a concatenated downlink (DL) TB, desired for two or more target nodes through the same relay node, thereby creating a one-to-many relaying operation. In some aspects, a source node may transmit, to a destination node, two or more packets, on different component carriers (CCs) or at different times, through the same relay node, thereby creating a many-to-one relaying operation.

The following description provides examples, and is not limiting of the scope, applicability, or examples set forth in the claims. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, as shown in FIG. 1, the UE 120a has a relaying manager that may be configured for receiving, from a source node, an indication to directly forward one or more transport blocks (TBs) to one or more destination nodes, wherein directly forwarding includes transmitting a TB of the one or more TBs to the one or more destination nodes through only a Physical (PHY) layer and a hybrid automatic repeat request (HARQ) portion of a Media Access Control (MAC) layer in a protocol stack of the relay node, receiving, from the source node, control information for one or more data channels configuring one downlink (DL) grant and two or more sidelink (SL) grants or two or more DL grants and one SL grant, decoding one or more TBs based, at least in part, on the control information; and directly forwarding the one or more TBs to the one or more destination nodes based, at least in part, on the indication and the control information, according to aspects described herein. For example, as shown in FIG. 1, the BS 110a has a relaying manager that may be configured for transmitting, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node and transmitting, to the relay node, control information for one or more data channels configuring one DL grant and two or more SL grants or two or more DL grants and one SL grant, according to aspects described herein.

As illustrated in FIG. 1, the wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and next generation NodeB (gNB or gNodeB), NR BS, 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. ABS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs or BSs. In the example shown in FIG. 1, a relay station 110r may communicate with the BS 110a and a UE 120r in order to facilitate communication between the BS 110a and the UE 120r. UE 120a may also be a relay station used to communicate with BS 110a and a UE 120s in order to facilitate communication between the BS 110a and the UE 120s. The relay 120s may be located within the coverage area 102a. A relay station may also be referred to as a relay BS, a relay UE, a relay, a relay node etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
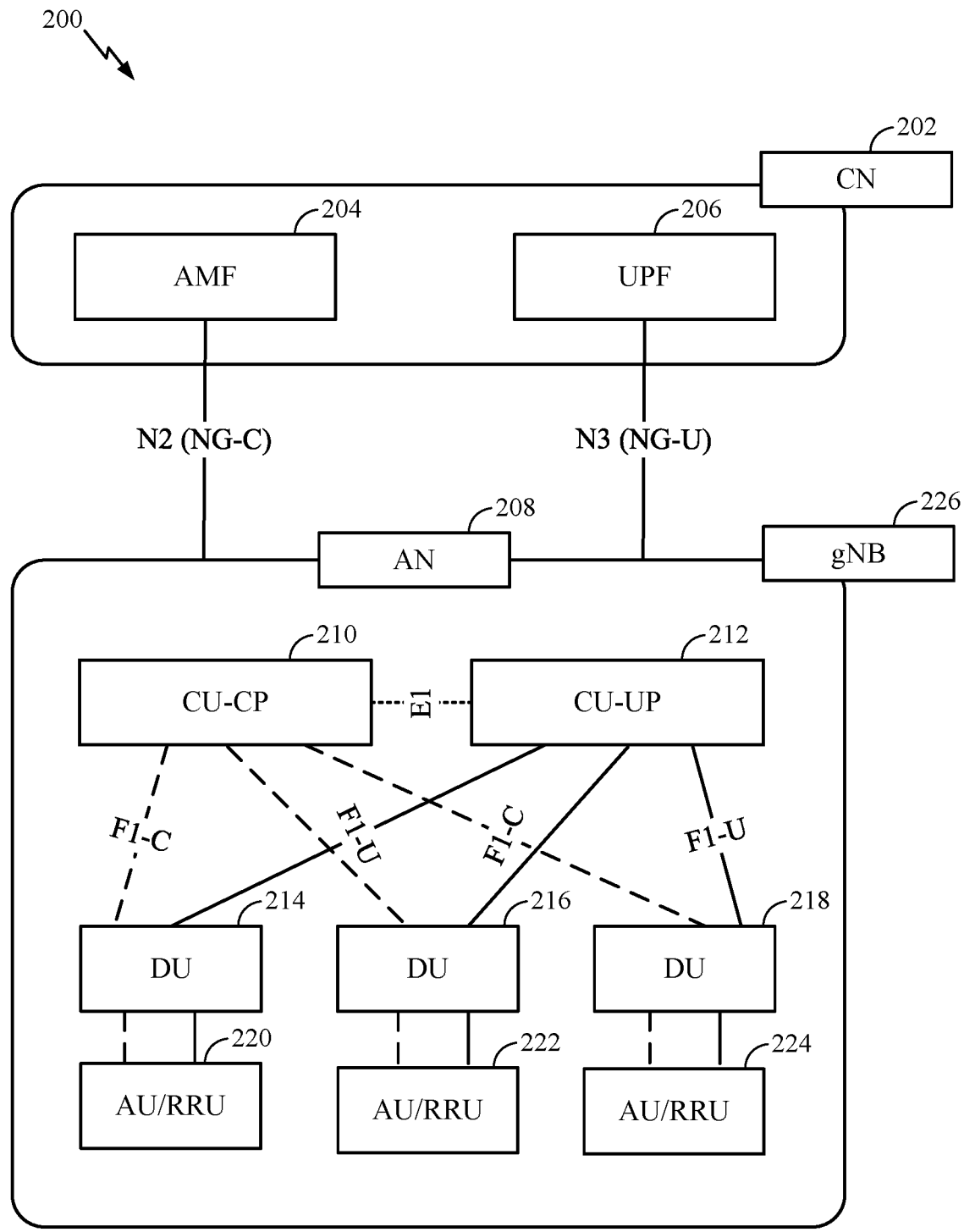
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 208 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE). The CU-UP(s) 212 may be connected to the CU-CP 210. For example, the DU-UP(s) 212 and the CU-CP 210 may be connected via an E1 interface. The CU-CP(s) 212 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
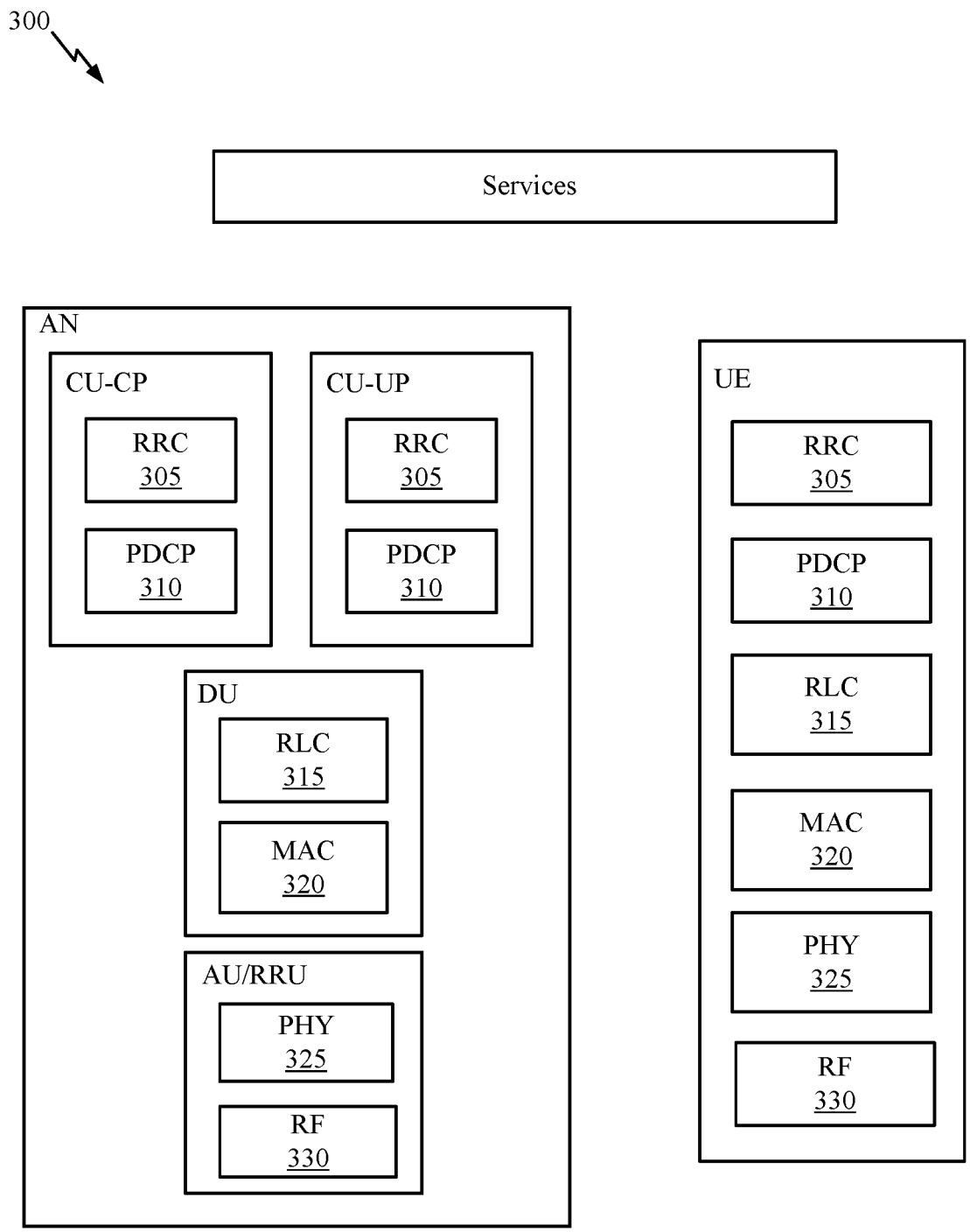
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
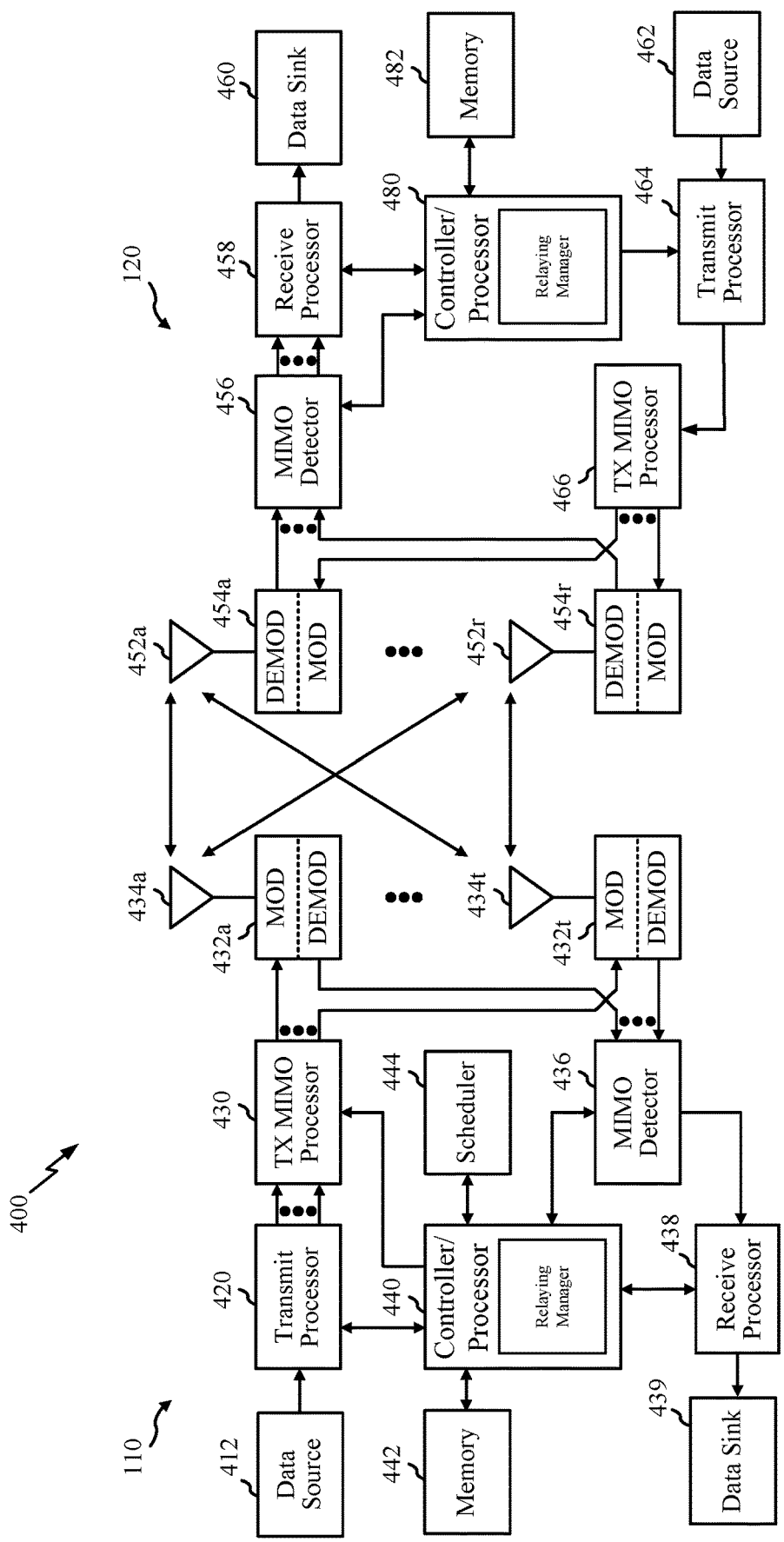
FIG. 4 is a block diagram conceptually illustrating a design of an example base station (BS) and user equipment (UE), in accordance with certain aspects of the present disclosure.

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 430, 438, and/or controller/processor 440 of the BS 110 may be used to perform the various techniques and methods described herein. For example, as shown in FIG. 4, the processor 440 has a relaying manager that may be configured for transmitting, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node and transmitting, to the relay node, control information for one or more data channels configuring one DL grant and two or more SL grants or two or more DL grants and one SL grant, according to aspects described herein. For example, as shown in FIG. 4, the processor 480 has a relaying manager that may be configured for configured for receiving, from a source node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node, receiving, from the source node, control information for one or more data channels configuring one DL grant and two or more SL grants or two or more DL grants and one SL grant, decoding one or more TBs based, at least in part, on the control information; and directly forwarding the one or more TBs to the one or more destination nodes based, at least in part, on the indication and the control information, according to aspects described herein.

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the base station 110 and may provide received signals to the demodulators (DEMODs) in transceivers 454*a* through 454*r*, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454*a* through 454*r* (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the BS 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
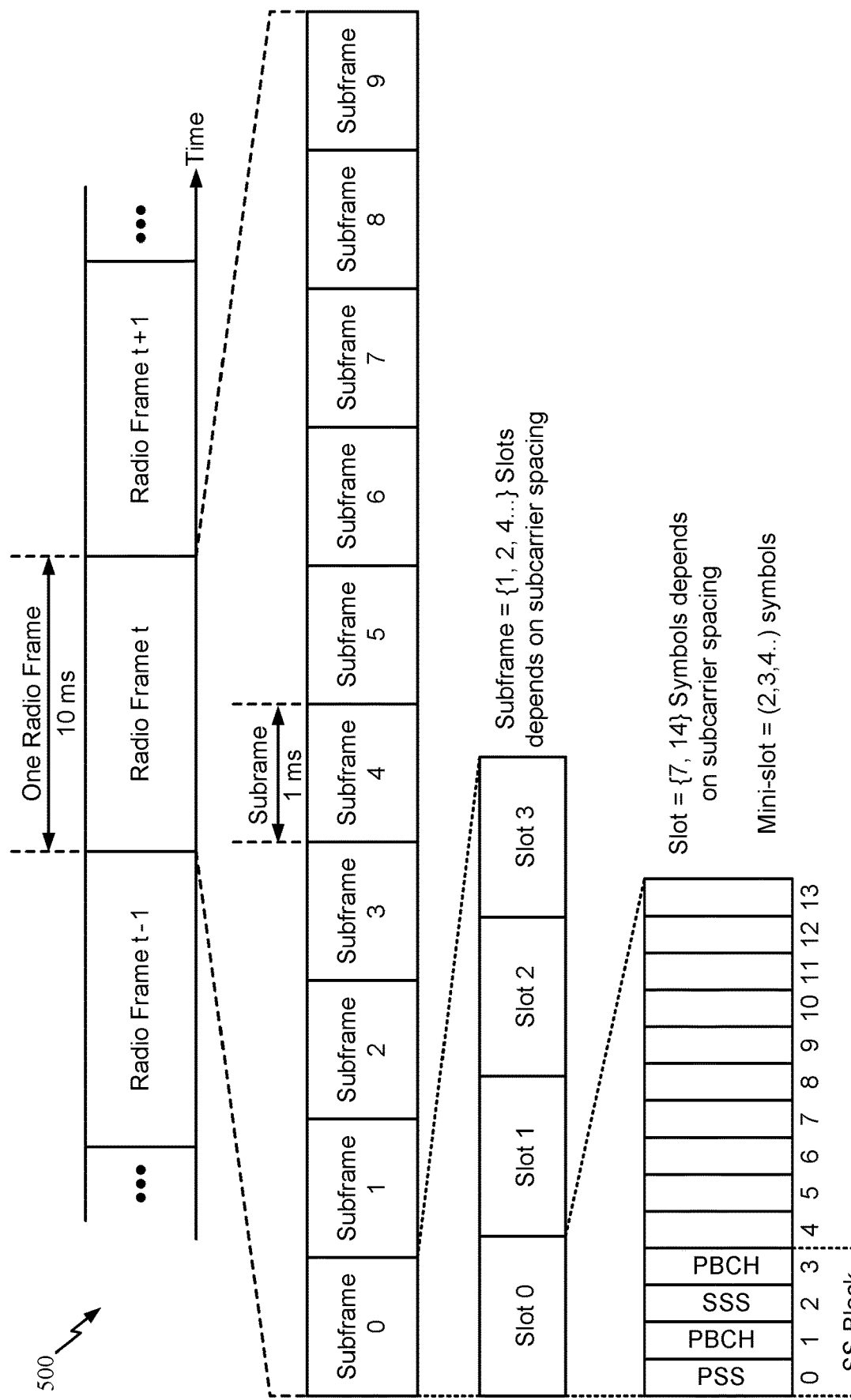
FIG. 5 illustrates an example of a frame format for a telecommunication system, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 5. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SS block can be transmitted up to sixty-four times, for example, with up to sixty-four different beam directions for mmW. The up to sixty-four transmissions of the SS block are referred to as the SS burst set. SS blocks in an SS burst set are transmitted in the same frequency region, while SS blocks in different SS bursts sets can be transmitted at different frequency locations.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which may use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

In the context of LTE, relaying implies that a device (e.g., destination node) communicates with a network via a relay node which is wirelessly connected to a source node via LTE radio interface, Un, a modified version of evolved terrestrial radio access network (E-UTRAN) air interface Uu. The source node may also serve its own UE as usual, in addition to sharing its radio resources for relay nodes.

As mentioned previously, in relaying operations, a relay node (also referred to herein as a relay station) is a node that receives a transmission of data and/or other information from an upstream node (e.g., source node) on a link between the source node and the upstream node. After receipt of the transmission, the relay node sends a transmission of the data and/or other information to a downstream node (e.g., a destination node) on a link between the relay node and the destination node.

Figure 6:
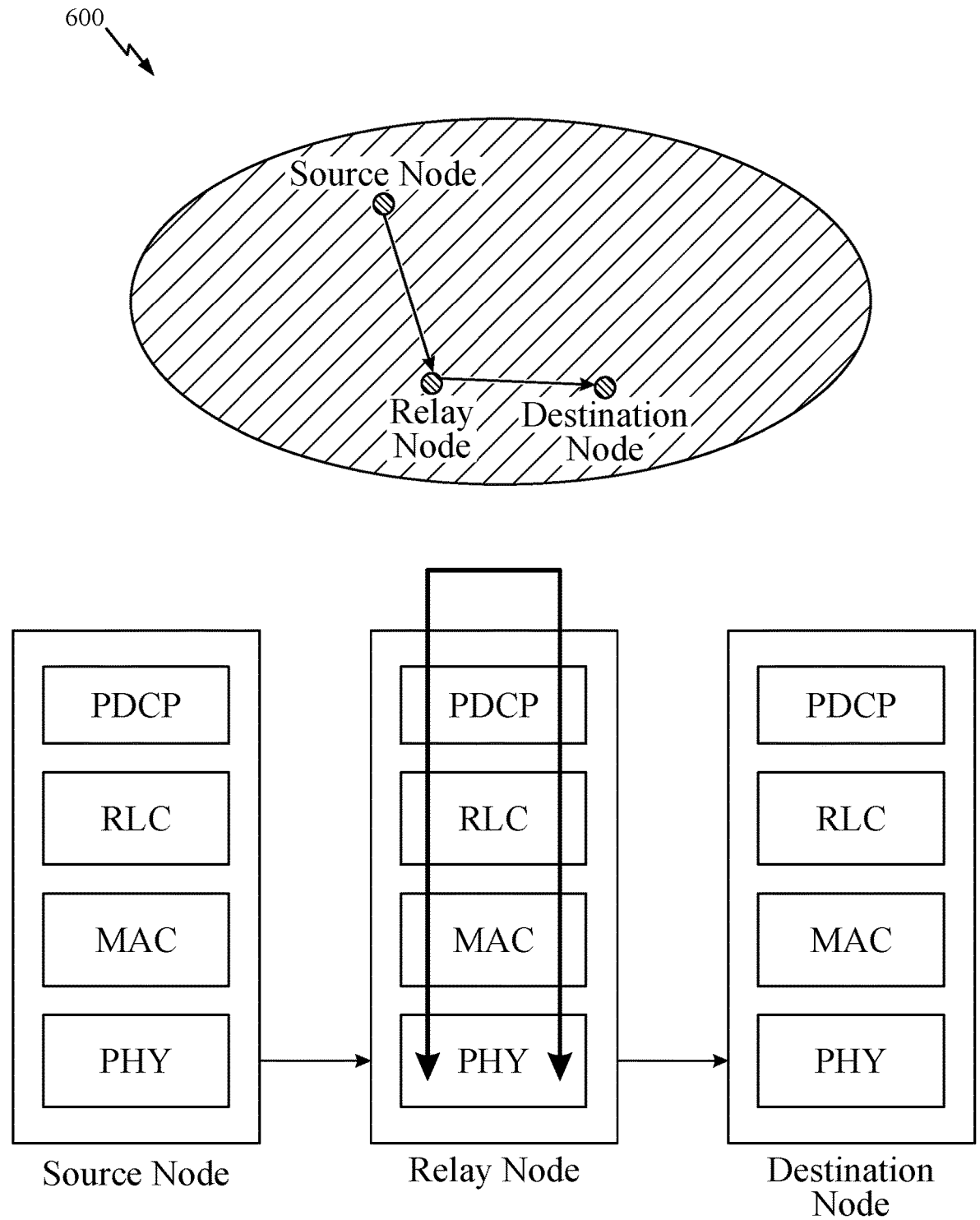
FIG. 6 illustrates an example relaying operation where a transport block (TB) size supported by a link between a source node and a relay node is not supported by a link between the relay node and a destination node.

FIG. 6 illustrates an example relaying operation where a TB size supported by a link between a source node and a relay node is not supported by a link between the relay node and a destination node. In the example relaying shown in FIG. 6, a relay node may communicate with a source node and a destination node in order to facilitate communication (i.e., send data) between the source node and the destination node. Data received from the source node may be transmitted up and down a protocol stack, at the relay node, before the relay node is able to send the data to the destination node. As shown in FIG. 6, the relay node receives the TB from the source node. The TB moves up the relay node's protocol stack through the PHY, MAC, RLC, and PDCP layers and back down the relay node's protocol stack through the PDCP, RCL, MAC, and PHY layers before the TB is transmitted to the destination node.

Figure 7:
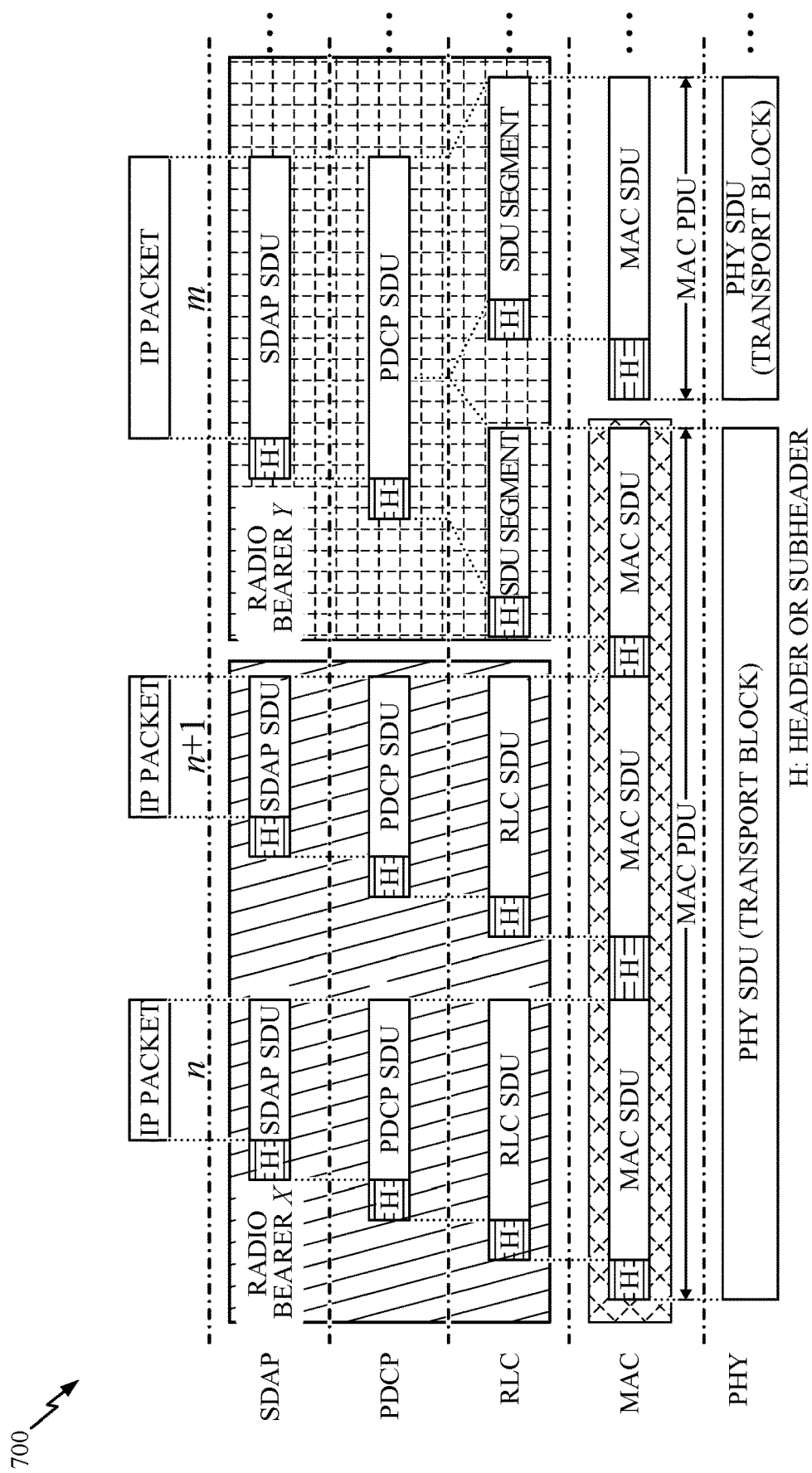
FIG. 7 illustrates example packet processing through a communication protocol stack, in accordance with certain aspects of the present disclosure.

FIG. 7 illustrates example packet processing through a communication protocol stack, in accordance with certain aspects of the present disclosure. In a wireless communication network, a packet of information may flow through several sub-layers of the communication protocol stack as it travels from one node to another. As shown in FIG. 7, the 5G new radio (NR) protocol stack is illustrated with the higher layers on top, such that an IP packet progresses downward through the stack. The packet enters the protocol stack through the service data adaptation protocol (SDAP) layer and travels down the protocol stack through PDCP layer, a RLC layer, and MAC layer. Each protocol layer may manipulate the data by adding header or subheader information (e.g., H as illustrated in FIG. 7), converting the data into different formats, and/or combining packets to form larger packets. The MAC layer generates a MAC protocol data unit (PDU) which may include multiple MAC SDUs or only one MAC SDU. Essentially, the MAC PDU becomes the PHY SDU (which may be called a TB) when transmitted to the PHY layer. When the receiving station receives the data, the data may work its way back up through a protocol stack at the receiving station. The protocol at each layer may reverse the processing that was done by the corresponding layer by the transmitting node; headers may be removed, data may be converted back to its original format, packets that were split into smaller packets may be recombined into larger messages, and so on.

Once the data has progressed through the PHY, MAC, RLC, PDCP, and SDAP layers, the IP packet may either be used or again progress downward through the protocol layers and be sent to a second receiving node. For example, where the receiving station is also a relay node, the packet may again progress downward through the protocol layers such that the TB is in a format supported by a link between the relay node and a destination node. Thus, when the packet reaches the PHY layer, it may again be sent to a destination node.

In some aspects, one-to-many and/or many-to-one relaying operations may be implemented to transmit multiple packets of data and/or other information to one or more targeted destination nodes, through a relay node.

Figure 8A:
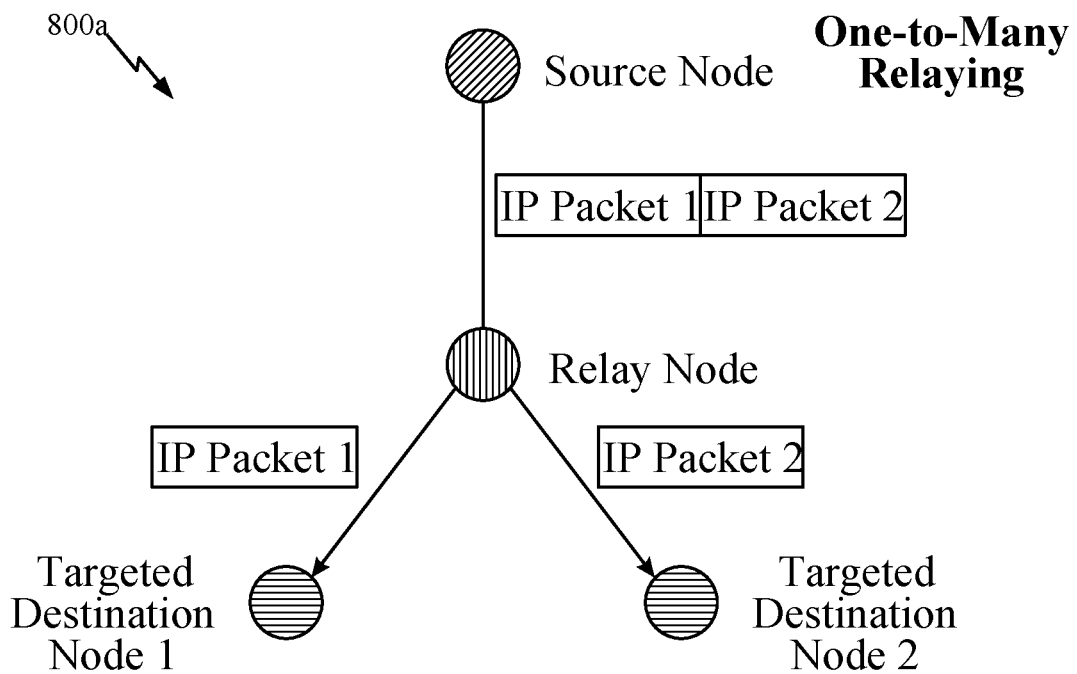
FIGS. 8A and 8B illustrate example one-to-many and many-to-one relaying, in accordance with certain aspects of the present disclosure.
Figure 8B:
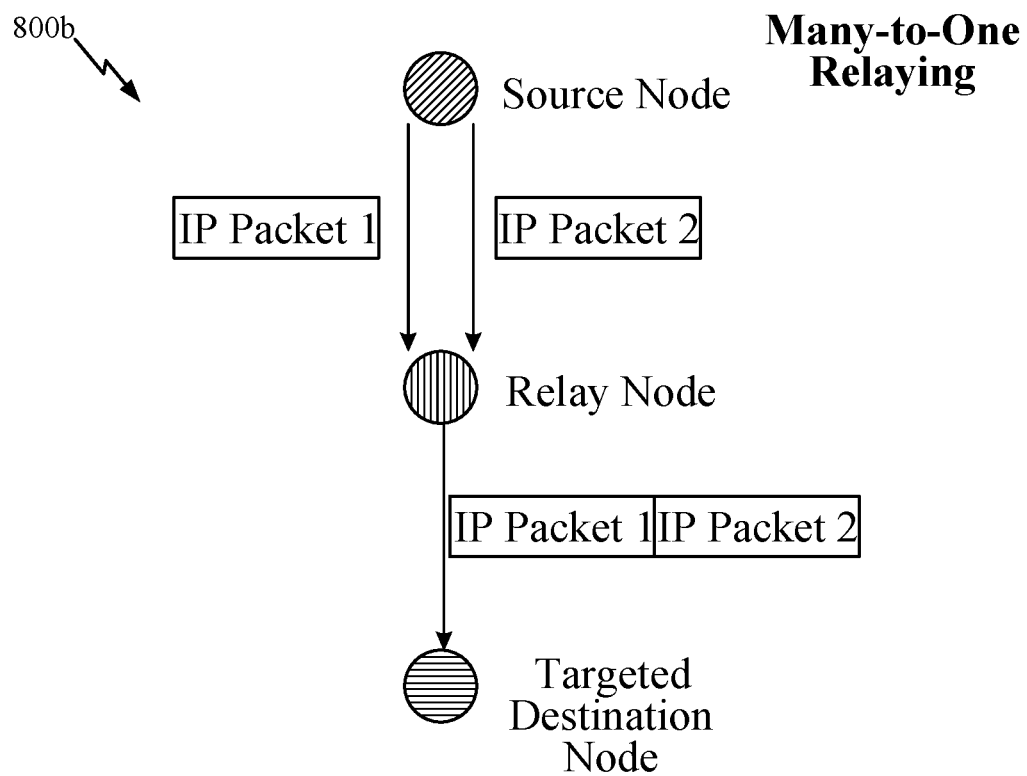

FIGS. 8A and 8B illustrate example one-to-many and many-to-one relaying operations, in accordance with certain aspects of the present disclosure. One-to-many relaying operations may involve transmitting multiple packets in a single TB, wherein each IP packet is transmitted to a different destination node through a single relay node. For example, as shown in the example of FIG. 8A, the source node may transmit internet protocol (IP) packet 1 and IP packet 2 targeted for destination node 1 and destination node 2, respectively, on a single DL transmission (or on a single component carrier (CC)) and through the same relay node. At the relay node, the DL TB (also referred to herein as the PHY SDU, which essentially becomes the MAC PDU as it moves up the protocol stack) may be split into two MAC sub-PDUs and transmitted to their respective targeted destination nodes. Each MAC sub-PDU represents its corresponding packet after the packet has traveled down the protocol stack through the PDCP layer, the RLC layer, and the MAC layer (i.e., each MAC sub-PDU corresponds to an IP packet which has been converted into different formats, combined with other packets, and/or manipulated with header or subheader information). Alternatively, many-to-one relaying operations may involve transmitting multiple IP packets in more than one transmission (or on different CCs), wherein the IP packets are desired for the same destination node. For example, as shown in the example of FIG. 8B, the source node may transmit, through a single relay node, TB 1 (including IP packet 1) on a first DL transmission (or on a first CC) and TB 2 (including IP packet 2) on a second DL transmission (or on a second CC). Both IP packet 1 and IP packet 2 may be targeted for the same destination node. Accordingly, at the relay node, TB1 and TB2 (also referred to herein as PHY SDU 1 and PHY SDU 2, which essentially becomes MAC PDU 1 and MAC PDU 2 as it moves up the protocol stack) may be concatenated into a single TB for transportation to the destination node.

Accordingly, in some cases, it may be advantageous to directly forward a TB to a destination node without the need for packet processing through all layers of the 5G NR protocol stack. Additionally, it may be advantageous to concatenate or split MAC PDUs at the relay node when the data transmitted includes multiple IP packets and/or data is targeted for multiple destination nodes.

Certain aspects provide techniques for direct TB forwarding in one-to-many and many-to-one relaying operations. More specifically, the present disclosure provides techniques for transmitting, from a relay node, one or more TB s to one or more destination nodes through only a PHY layer and a hybrid automatic repeat request (HARM) portion of a MAC layer in a protocol stack of the relay node.

Example Splitting and Concatenating of Media Access Control (MAC) Protocol Data Units (PDUs) for Direct Transport Block (TB) Forwarding in Relaying Operations Certain aspects of the present disclosure provide apparatus, methods, processing systems, and computer readable mediums for relaying operations. For example, certain aspects provide techniques and apparatus for direct transport block (TB) forwarding in one-to-many and many-to-one relaying operations.

As mentioned above, when a link between a source node and a relay node (e.g., source-relay link) supports a TB size different than a TB size supported by a link between the source node and a destination node (e.g., relay-destination link), then a normal relaying scheme may be implemented, requiring data to be processed (i.e., transmitted up and down the 5G new radio (NR) protocol stack at the relay node) before transmission to the destination node. However, in some cases where the source-relay link and the relay-destination link support the same TB size, in accordance with aspects of the present disclosure, the relay node may directly forward the TB, received from the source node, to the destination node. As used herein, directly forwarding the TB refers to a relay node transmitting a TB to a destination node without the TB going through the relay node's complete protocol stack.

Figure 9:
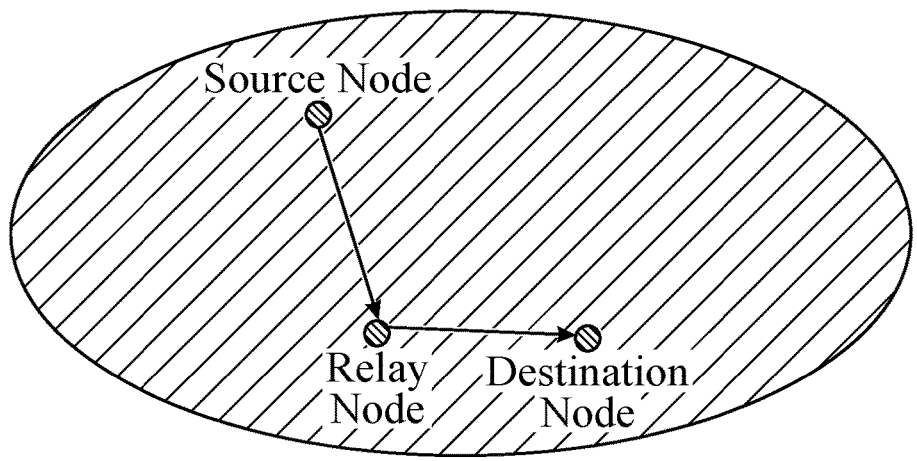
FIG. 9 illustrates an example relaying operation where a source-relay link and a relay-destination link support the same TB size, in accordance with certain aspects of the present disclosure.
Figure 9:
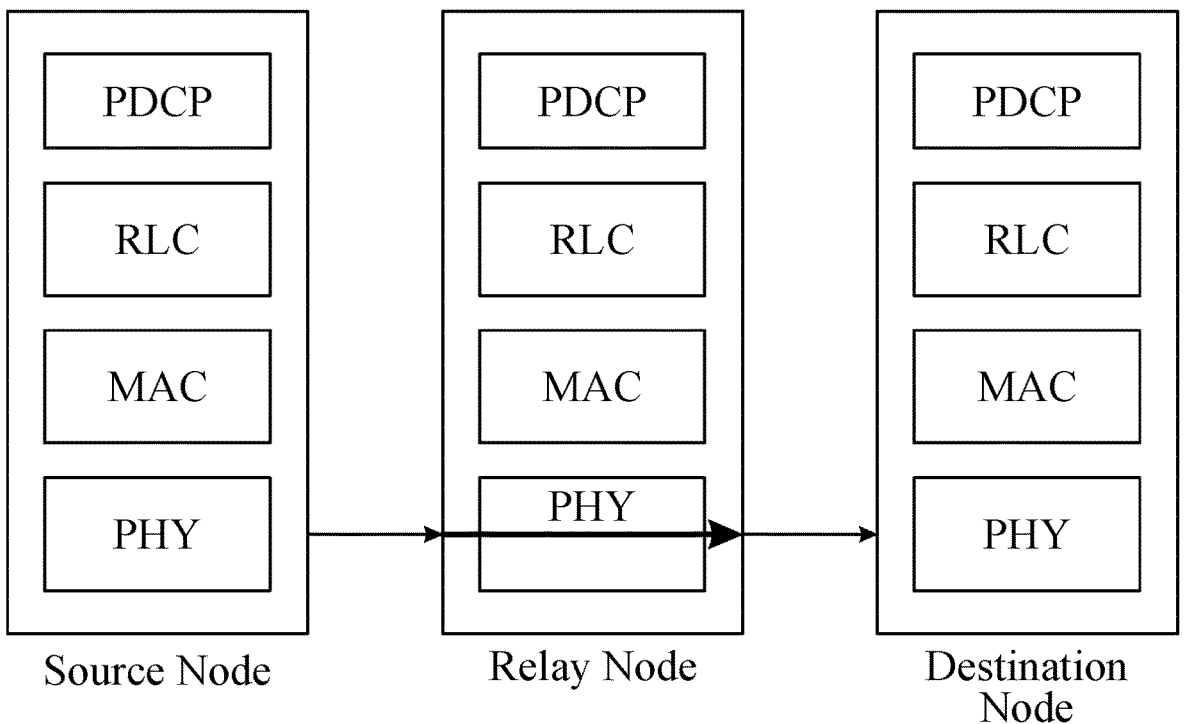

FIG. 9 illustrates an example relaying operation where a source-relay link and a relay-destination link support the same TB size, in accordance with certain aspects of the present disclosure. In the example relaying operation shown in FIG. 9, a relay node may communicate with a source node and a destination node in order to transmit data between the source node and the destination node. Data received from the source node may be forwarded directly to the destination node. Direct forwarding may include transmitting a TB to the destination node through only a physical (PHY) layer and a hybrid automatic repeat request (HARQ) portion of a media access control (MAC) layer in a protocol stack of the relay node. Instead of processing the packet up and down each layer in the protocol stack, the relay node may demodulate and decode the received PHY layer data channel from the source node (e.g., demodulate and decode the TB) and then encode and modulate the TB, such that it may be forwarded to the destination node. The MAC layer of the protocol stack at the relay node may also be involved in the TB forwarding process because the MAC layer controls the HARQ process. For example, if a first transmission from the relay node to the destination node fails, then the MAC layer may need to perform HARQ. While the MAC layer may be involved in the direct TB forwarding, the MAC protocol data unit (PDU) may not be changed at the relay node.

To enable direct TB forwarding in relaying operations, resources may be allocated such that the source-relay link and the relay-destination link support the same TB size. Resource allocation (which may be performed by the source node) may include determining a number of identifications (IDs) to allocate for each link and determining a modulation and coding scheme (MCS) to be selected for each link based on link quality, respective to each of the source-relay link and the relay-destination link.

Additionally, the relay node may know whether it should use a normal relaying scheme or use the direct TB forwarding scheme. In some aspects, the relay node may be instructed by the source node to use direct TB forwarding (i.e., the source node may send, to the relay node, an indication to directly forward the TB).

In aspects of the present disclosure, one-to-many and many-to-one relaying operations may be used when the data transmitted includes multiple internet protocol (IP) packets and/or multiple targeted destination nodes.

In some aspects, a relay node may receive a single TB, in accordance with a downlink (DL) grant, to be forwarded to multiple destination nodes. The TB may include two or more concatenated MAC sub-protocol data units (MAC sub-PDUs) corresponding to two or more IP packets. Accordingly, the relay node may be capable of splitting the TB into two or more MAC sub-PDUs and directly forwarding the MAC sub-PDUs to multiple destination nodes.

In some aspects, a relay node may receive multiple TBs, in accordance with multiple DL grants, to be forwarded to a single destination node. Each TB received may include a single MAC sub-PDU corresponding to a single IP packet. Accordingly, the relay node may be capable of concatenating the MAC sub-PDUs in a concatenated TB and directly forwarding the concatenated TB to a single destination node.

Figure 10:
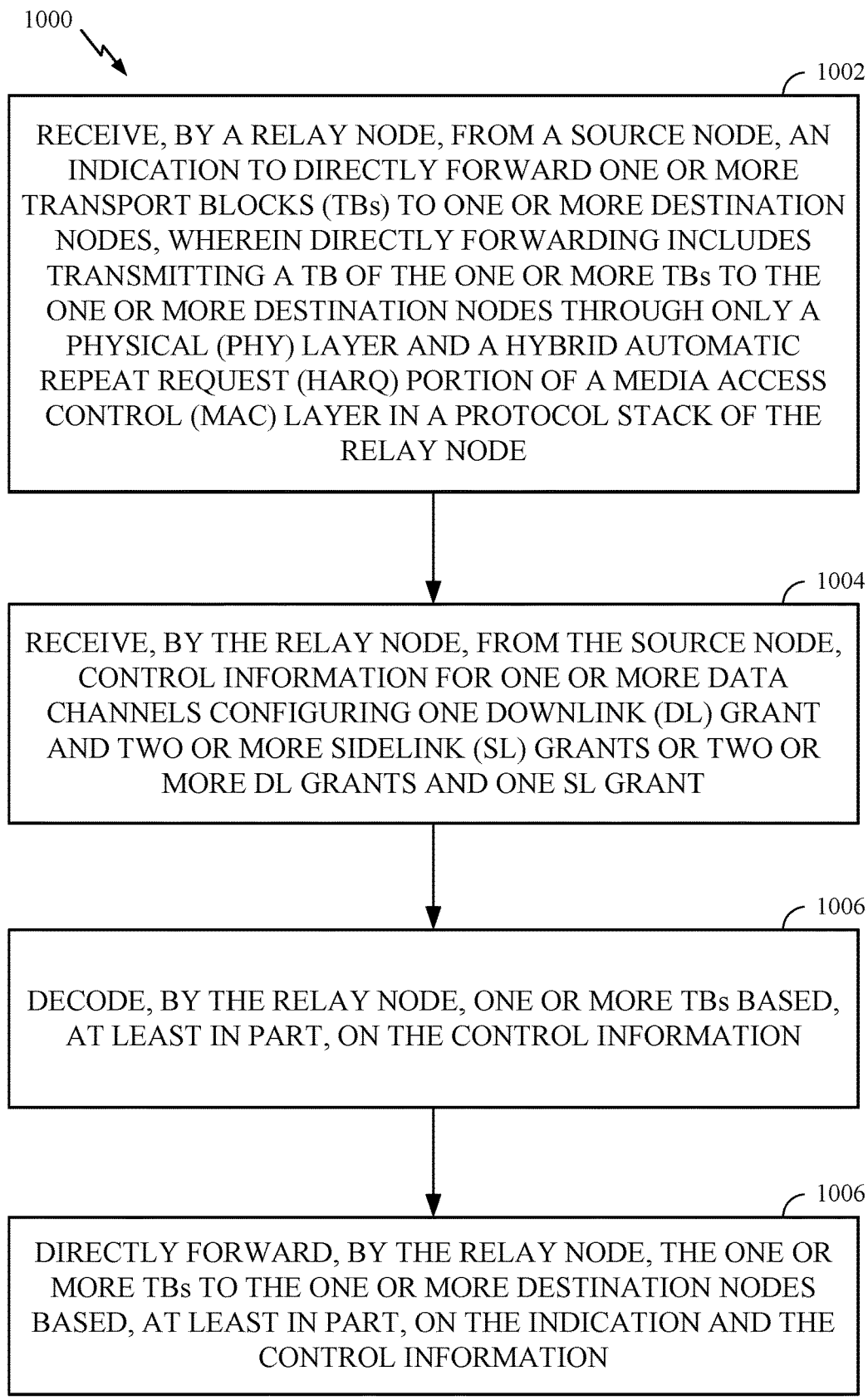
FIG. 10 is a flow diagram illustrating example operations for wireless communication by a relay node, in accordance with certain aspects of the present disclosure.

FIG. 10 is a flow diagram illustrating example operations 1000 for wireless communication, in accordance with certain aspects of the present disclosure. The operations 1000 may be performed, for example, by a relay node (e.g., such as a UE 120 or relay station 110r in the wireless communication network 100). The operations 1000 may be complementary operations by the relay node to the operations 1100 performed by the source node (e.g., such as a BS 110 in the wireless communication network 100). Operations 1000 may be implemented as software components that are executed and run on one or more processors (e.g., processor 480 of FIG. 4). Further, the transmission and reception of signals by the relay node in operations 900 may be enabled, for example, by one or more antennas (e.g., antennas 452 of FIG. 4). In certain aspects, the transmission and/or reception of signals by the relay node may be implemented via a bus interface of one or more processors (e.g., processor 480) obtaining and/or outputting signals.

The operations 1000 may begin, at block 1002, by a relay node, receiving, from a source node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node. At block 1004, the relay node, receives, from the source node, control information for one or more data channels configuring one DL grant and two or more sidelink (SL) grants or two or more DL grants and one SL grant. At block 1006, the relay node decodes one or more TBs based, at least in part, on the control information. At block 1008, the relay node directly forwards the one or more TBs to the one or more destination nodes based, at least in part, on the indication and the control information.

Figure 11:
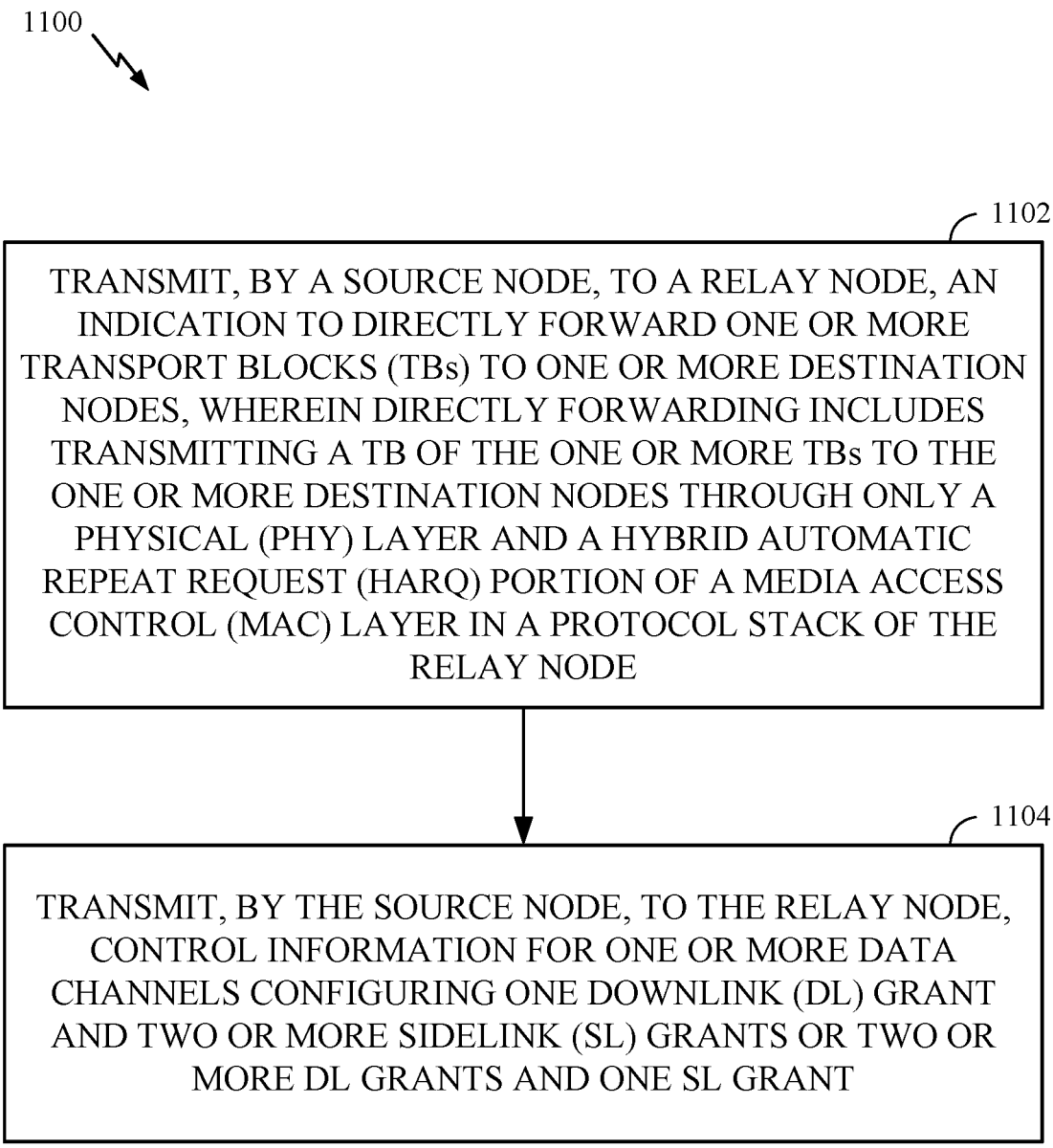
FIG. 11 is a flow diagram illustrating example operations for wireless communication by a source node, in accordance with certain aspects of the present disclosure.

FIG. 11 is a flow diagram illustrating example operations 1100 for wireless communication, in accordance with certain aspects of the present disclosure. The operations 1100 may be performed, for example, by a source node (e.g., such as a BS 110 in the wireless communication network 100). Operations 1100 may be implemented as software components that are executed and run on one or more processors (e.g., processor 440 of FIG. 4). Further, the transmission and reception of signals by the source node in operations 1100 may be enabled, for example, by one or more antennas (e.g., antennas 434 of FIG. 4). In certain aspects, the transmission and/or reception of signals by the source node may be implemented via a bus interface of one or more processors (e.g., processor 440) obtaining and/or outputting signals.

The operations 1100 may begin, at block 1102, by the source node transmitting, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node. At block 1104, the source node transmits, to the relay node, control information for one or more data channels configuring one DL grant and two or more SL grants or two or more DL grants and one SL grant.

Figure 12:
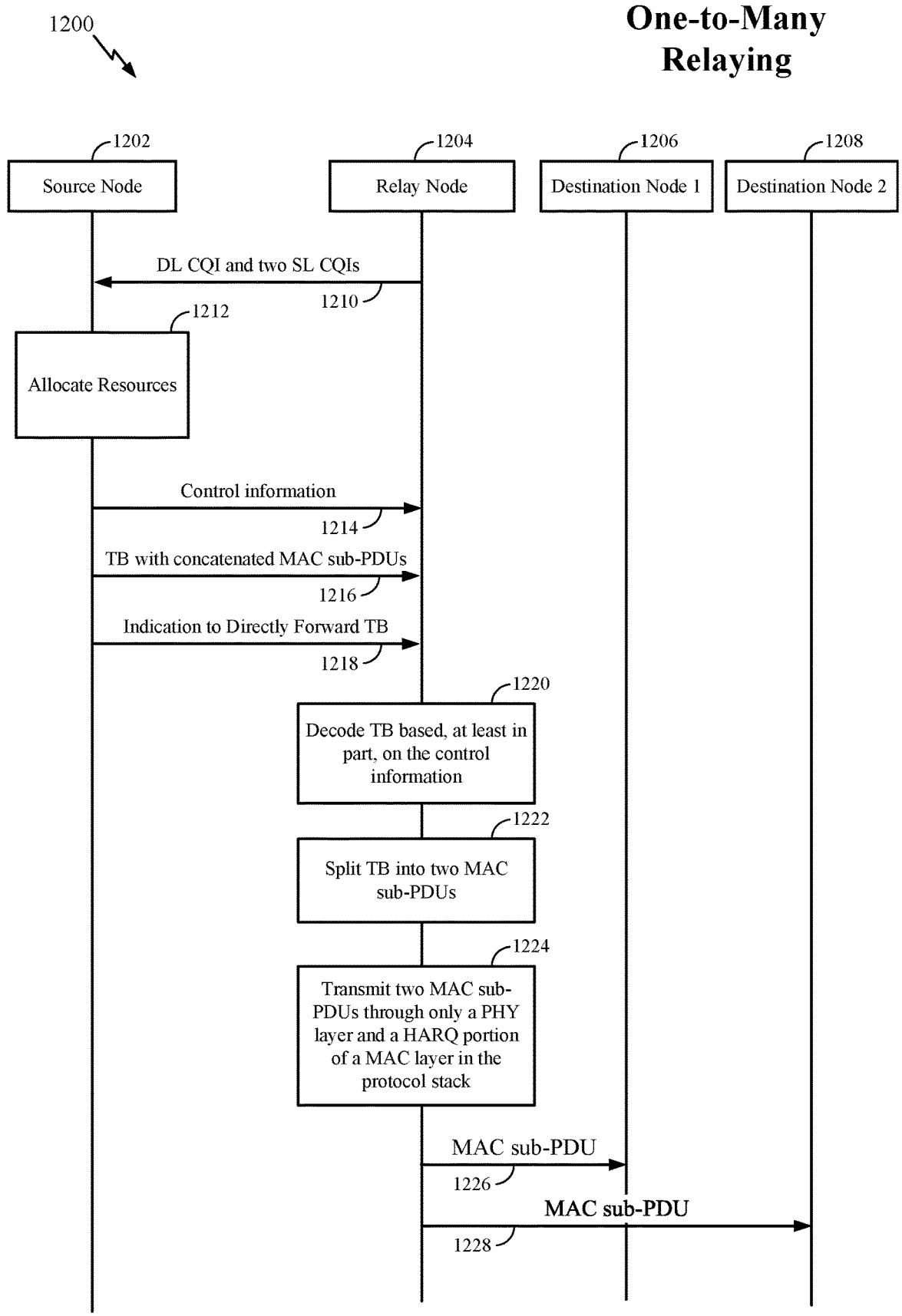
FIG. 12 is a call flow diagram illustrating example signaling for one-to-many relaying operations in sidelink (SL) transmission mode 1, in accordance with aspects of the present disclosure.
Figure 13:
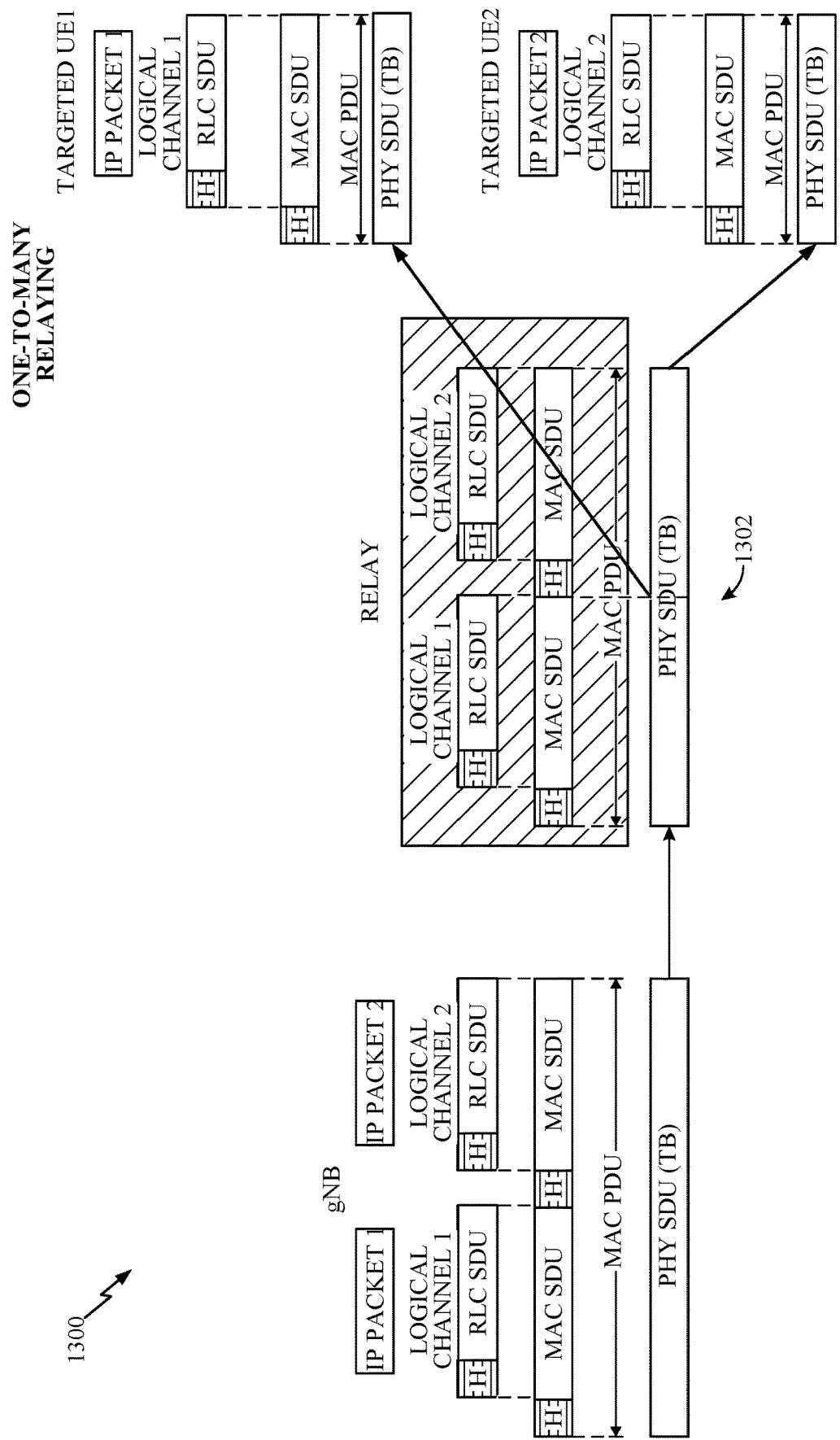
FIG. 13 illustrates splitting of the media access control (MAC) protocol data unit (PDU) in an example one-to-many relaying operation.
Figure 14:
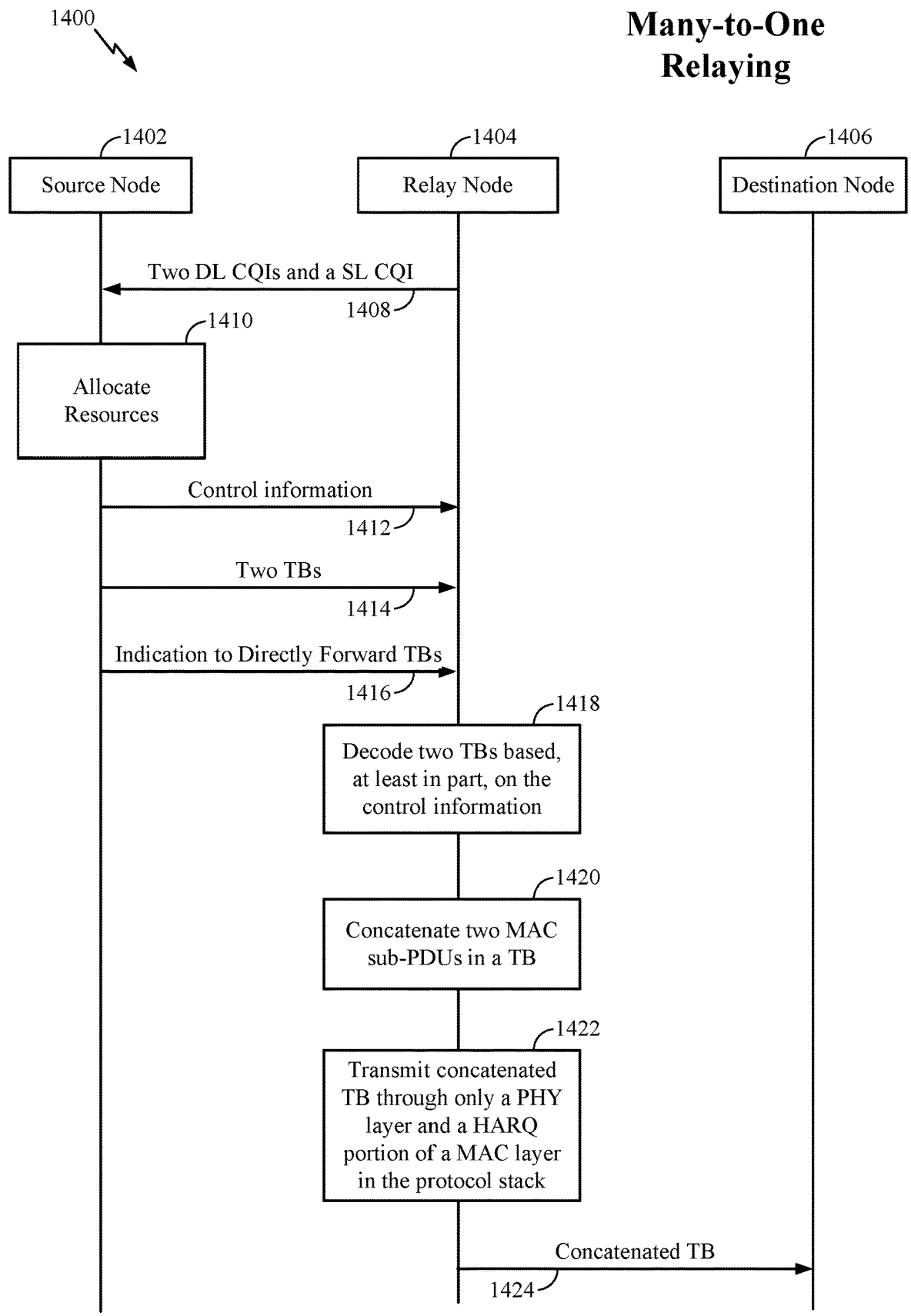
FIG. 14 is a call flow diagram illustrating example signaling for many-to-one relaying operations in SL transmission mode 1, in accordance with aspects of the present disclosure.

Operations of FIGS. 10 and 11 may be understood with reference to FIGS. 12, 13, and 14, which illustrate direct TB forwarding in one-to-many and many-to-one relaying operations. In some examples, a relay node may know to use direct TB forwarding in the relaying operation based on an indication, sent by a source node, to directly forward a TB to a destination node.

FIG. 12 is a call flow diagram 1200 illustrating example signaling for one-to-many relaying operations in SL transmission mode 1, in accordance with aspects of the present disclosure. In NR, there are generally two basic SL resource allocation modes. According to a first mode (Mode 1), as shown in FIG. 12, a source node 1202 may allocate resources for SL communications between a relay node 1204 and destination nodes 1206 and 1208.

In one-to-many relaying operations, a relay node may receive a single TB, in accordance with a downlink (DL) grant, to be forwarded to multiple destination nodes. The TB may include two or more concatenated MAC sub-PDUs corresponding to two or more IP packets. Specifically, the MAC layer of the source node's protocol stack may map several service data units (SDUs) to a MAC SDU. Further, multiple MAC SDUs may be concatenated to generate a MAC PDU (essentially a TB) with multiple MAC sub-PDUs (including their headers). Because the source node has the capability to concatenate multiple MAC sub-PDUs into a single TB, the source node may also know the size of each of the concatenated MAC sub-PDUs in the TB. Accordingly, the source node may allocate corresponding SL resources for the direct TB forwarding of MAC sub-PDUs to each targeted destination node in the relaying operation.

The one-to-many relaying operation of FIG. 12, may begin, at 1210, by the relay node 1204 transmitting, to the source node 1202, one or more channel quality indicator (CQI) indices. In some examples, one of the CQI indices may comprise SL CQI for a link between the relay node 1204 and the destination node 1206. In some examples, one of the CQI indices may comprise SL CQI for a link between the relay node 1204 and the destination node 1208. In some examples, one of the CQI indices may comprise a DL CQI for a link between the relay node 1204 and the source node 1202.

At 1212, based on the received CQI indices, the source node 1202 may perform resource allocation. In some aspects, where a SL CQI is received from the relay node 1204, the source node 1202 may allocate SL resources for a SL grant (e.g., a grant for the TB includes a SL grant) based on the SL CQI. In some aspects, where a DL CQI is received from the relay node 1204, the source node 1202 may allocate DL resources for a DL grant (e.g., a grant for the TB includes a DL grant) based on the DL CQI. The source node may allocate resources for a SL grant and a DL grant such that the TB size supported by the source-relay link (e.g., DL), the relay-destination link for destination node 1206 (e.g., SL for destination node 1206), and the relay-destination link for destination node 1208 (e.g., SL for destination node 1208) support the same TB size. In other words, a first TB size supported by the source-relay link, a second TB size supported by the relay-destination link for destination node 1206, and a third TB size supported by the relay-destination link for destination node 1208 may be the same.

At 1214, the source node 1202 may transmit to the relay node 1204 control information for one or more data channels for decoding a TB. In the one-to-many relaying operation, the source node 1202 may transmit two packets for two destination nodes (e.g., destination nodes 1206 and 1208) through the same relay node 1204, thus, the control information transmitted by the source node 1202 to the relay node 1204 may configure one DL grant and two SL grants. In some examples, the DL grant and the two SL grants may be separate. In some examples, the DL grant and the two SL grants may be joined to form one joint DL/SL grant.

In some examples, the control information may further configure one or more length fields of one or more MAC sub-PDUs concatenated in a single TB during many-to-one relaying operations. Thus, a joint DL/SL grant transmitted by the source node 1202 to the relay node 1204 may include the DL grant, two SL grants, and a length of one MAC sub PDU in a single format. The source node may configure MAC sub-PDU length fields in the control information because the source node knows the size of each MAC sub-PDU prior to concatenating the MAC sub-PDUs in a single TB for transmission.

At 1216, the source node 1202 may transmit a single TB in accordance with the DL grant. The transmitted TB may comprise two concatenated MAC sub-PDUs corresponding to two IP packets. More specifically, a first IP packet targeted for destination node 1206 and a second IP packet targeted for destination node 1208 may be concatenated in a single DL TB transmitted, by the source node 1202, to the relay node 1204.

At 1218, the source node 1202 may further send an indication, to the relay node 1204, to directly forward two TBs (e.g., two MAC sub-PDUs split from the received DL TB) to a destination node, wherein directly forwarding includes transmitting the two TBs to the destination nodes 1206 and 1208 through only a PHY layer and a HARQ portion of a MAC layer in a protocol stack of the relay node 1204. In some examples, the indication may include a 1-bit indication in either the SL grants alone or in the SL grants which are part of the joint DL/SL grant. In some examples, the indication may be sent via radio resource control (RRC) signaling. An RRC pre-configured relay node 1204 may be configured to perform direct TB forwarding in all relaying transmissions.

Following receipt of the control information, at 1220, the relay node 1204 may decode the TB based, at least in part, on the control information. At 1222, the relay node 1204 may use the length field in the control information to split the received concatenated TB at the PHY layer into two MAC sub-PDUs (each MAC sub-PDU targeted for either destination node 1206 or destination node 1208).

At 1224, the relay node 1204 may determine, based on the indication, to transmit the two MAC sub-PDUs through only a PHY layer and a HARQ portion of a MAC layer in the protocol stack at the relay node 1204 (as opposed to processing the packet up and down the protocol stack). Subsequently, the relay node 1204 may directly forward, at 1226 and 1228, respectively, one of the MAC sub-PDUs to destination node 1206 and the other MAC sub-PDU to destination node 1208.

In some aspects, the control information may include an identification (ID) indicating the destination node 1106 to which the relay node 1104 may directly forward the TB to. Accordingly, the relay node 1104 may directly forward, at 1120, the TB to the destination node 1106 which corresponds to the received ID.

FIG. 13 illustrates splitting of the MAC PDU in an example 1300 one-to-many relaying operation. As shown in FIG. 13, IP packet 1 and IP packet 2 may progress downward through several sub-layers, along logical channel 1 and logical channel 2, respectively, of the communication protocol stack at the source node (e.g., gNB). Each protocol layer may manipulate the data by adding header or sub-header information (e.g., H as illustrated in FIG. 13), convert the data into different formats, and combine IP packet 1 and IP packet 2 into a larger packet. The MAC layer may generate a MAC PDU which concatenates the two MAC SDUs corresponding to IP packet 1 and 2. Essentially, the MAC PDU becomes the PHY SDU (which may be called a TB) when transmitted to the PHY layer of the relay node.

When the PHY SDU is transmitted, by the source node, to the relay node, the relay node may split the concatenated PHY SDU into two MAC sub-PDUs based, at least in part, on the one or more length fields (configured by the source node in the control information transmitted to the relay node) of the one or more MAC sub-PDUs. More specifically, the relay node may split the PHY SDU into a first MAC sub-PDU and a second MAC sub-PDU at point 1302. The relay node may determine the splitting point 1302 of the PHY SDU based on the length field for the first MAC sub-PDU in the joint DL/SL grant transmitted by the source node. The first MAC sub-PDU may be directly forwarded to a first destination node (e.g., Targeted UE1). The second MAC sub-PDU may be directly forwarded to a second destination node (e.g., Targeted UE2).

While FIGS. 12 and 13 are directed to the transmission of two packets in a one-to-many relaying operation, similar operations may be applied when more than two packets are transmitted. Accordingly, multiple SL grants and multiple length fields for each MAC sub-PDU in a joint DL/SL grant may be configured such that the received DL TB may be split into multiple (e.g., 2 or more) MAC sub-PDUs and transmitted to multiple (e.g., 2 or more) destination nodes accordingly.

FIG. 14 is a call flow diagram 1400 illustrating example signaling for many-to-one relaying operations in SL transmission mode 1, in accordance with aspects of the present disclosure. In many-to-one relaying operations, a relay node may receive two or more TBs, in accordance with two or more DL grants, to be forwarded to a single destination node. Each TB may include a MAC sub-PDU corresponding to a single IP packet. To enable relaying of multiple TBs to a single destination node, the source node may instruct the relay node to perform TB concatenation. Specifically, multiple MAC sub-PDUs may be concatenated, at the relay node, to generate a MAC PDU (essentially a concatenated TB) with multiple MAC sub-PDUs (including their headers). Because the source node may know the number of TBs (with single MAC sub-PDUs) to be transmitted to the relay node, the source node may know the total DL TB size. Thus, the source node may allocate corresponding SL resources for the direct forwarding of a concatenated TB to a targeted destination node.

Similar to FIG. 12, in FIG. 14, the relay node 1404 may transmit CQI information to the source node 1402, the source node 1402 may allocate resources based, at least in part, on the CQI, and the source node 1402 may transmit, to the relay node 1404, control information and an indication to directly forward one or more TBs to one or more destination nodes. However, unlike the one-to-many relaying operation of FIG. 12, the many-to-one relaying operation in FIG. 14 illustrates transmission of multiple packets to only one destination node (e.g., destination node 1406). Therefore, CQI information may include two DL CQIs and one SL CQI. Additionally, control information may configure two DL grants and only one SL grant.

Further, at 1414, the source node 1402 may transmit two TBs in accordance with the two DL grants, wherein each TB comprises one MAC sub-PDU corresponding to a single IP packet. At 1418, the relay node 1404 may decode the two TBs based on the received control information. At 1420, the relay node 1404 may concatenate the two MAC sub-PDUs in a concatenated TB (essentially combining both DL TBs in a single concatenated TB).

At 1422, the relay node 1404 may determine, based on the indication, to transmit the concatenated TB through only a PHY layer and a HARQ portion of a MAC layer in the protocol stack at the relay node 1404 (as opposed to processing the packet up and down the protocol stack). Subsequently, the relay node 1404 may directly forward, at 1424, the concatenated TB to destination node 1406.

In some examples, all transmitted packets (one packet per transmitted TB) may not be received by the relay node 1404. If the source node 1402 has sufficient time to receive hybrid automatic repeat request (HARQ) acknowledgement (ACK) or negative acknowledgement (NACK) feedback from the relay node 1404, then the relay node 1404 may transmit, to the source node 1402, HARQ ACK feedback for received TBs and HARQ NACK feedback for TBs not received but transmitted by the source node 1402. Based on the ACK/NACK feedback, the source node 1402 may know which TBs were received by the relay node 1404 and allocate corresponding SL resources accordingly. Thus, the SL grant transmitted, from the source node 1402, to the relay node 1404 may be based, at least in part, on the number of received TBs at the relay node 1404.

In some examples, all transmitted packets (one packet per transmitted TB) may not be received by the relay node 1404, and the source node 1402 may not have sufficient time to receive HARQ ACK/NACK feedback from the relay node 1404. Accordingly, the source node 1402 may perform TB matching and SL resource allocation for all possible combinations of TBs that potentially could be received at the relay node 1404.

In some examples, the source node 1402 may perform TB matching and SL resource allocation by configuring the SL grant with one or more SL grants, each corresponding to a separate TB transmitted by the source node or one or more combinations of SL grants, wherein each SL grant corresponds to a separate TB transmitted by the source node. For example, when 2 packets are transmitted in a many-to-one relaying operation which does not provide sufficient time for the relay node to receive ACK/NACK feedback, the source node may allocate resources for a grant such that the grant includes a DL grant for packet 1's TB, a DL grant for packet 2's TB, a SL grant if only packet 1's TB is received at the relay node, a SL grant if only packet 2's TB is received at the relay node, and a SL grant if both packet 1 and packet's TBs are received at the relay node. In another example involving transmission of 3 packets, the source node may allocate resources for a grant such that the grant includes 3 DL grants (one for each packet's TB) and 7 SL grants (e.g., a SL grant if only packet 1's TB is received, a SL grant if only packet 2's TB is received, a SL grant if only packet 3's TB is received, a SL grant if only packet 1 and 2's TBs are received, a SL grant if only packet 1 and 3's TBs are received, a SL grant if only packet 2 and 3's TBs are received, and a SL grant if all packet 1, 2 and 3's TBs are received). Thus, as the number of transmitted packets increases, the number of SL grants configured by the source node exponentially increases.

Allocating resources for all possible cases does not scale with the number of concatenated packets transmitted from the source node to the relay node; therefore, grant overhead is increased as the number of transmitted packets increases. To reduce grant overhead, in some examples where TB size for each of the packets transmitted is the same, the source node 1402 may perform TB matching and SL resource allocation by configuring the SL grant with one or more SL grants corresponding to one or more TBs received by the relay node, wherein the one or more TBs received by the relay node is less than or equal to a number of TBs transmitted by the source node. The source node may allocate resources for a grant such that the grant includes a DL grant for all packets transmitted (e.g., DL grant for packet 1, packet 2 . . . , packet n), a SL grant if only one packet is received, a SL grant if only two packets are received, and other SL grants up to a SL grant if all packets transmitted are received. For example, when three packets are transmitted in a many-to-one relaying operation which does not provide sufficient time for the relay node to receive ACK/NACK feedback and the TB size for each packet is the same, the source node may allocate resources for a grant such that the grant includes a DL grant for packet 1, 2 and 3, a SL grant if only 1 packet is received, a SL grant if only 2 packets are received, and a SL grant if all packets are received.

In the foregoing examples, the relay node may select one of the configured SL grants based, at least in part, on a number of the one or more received TBs, concatenate the one or more received TBs in a concatenated TB, and directly forward the concatenated TB to one destination node based. The relay node directly forwards the concatenated TB based on the indication to directly forward, an ID of a destination node, and the selected configured SL grant.

While FIG. 14 is directed to the transmission of two packets in a many-to-one relaying operation, similar operations may be applied when more than two packets are transmitted. Accordingly, multiple DL grants a may be configured for transmission of multiple DL TBs such that the received DL TBs may be concatenated in a single TB and transmitted to a single destination node.

Figure 15:
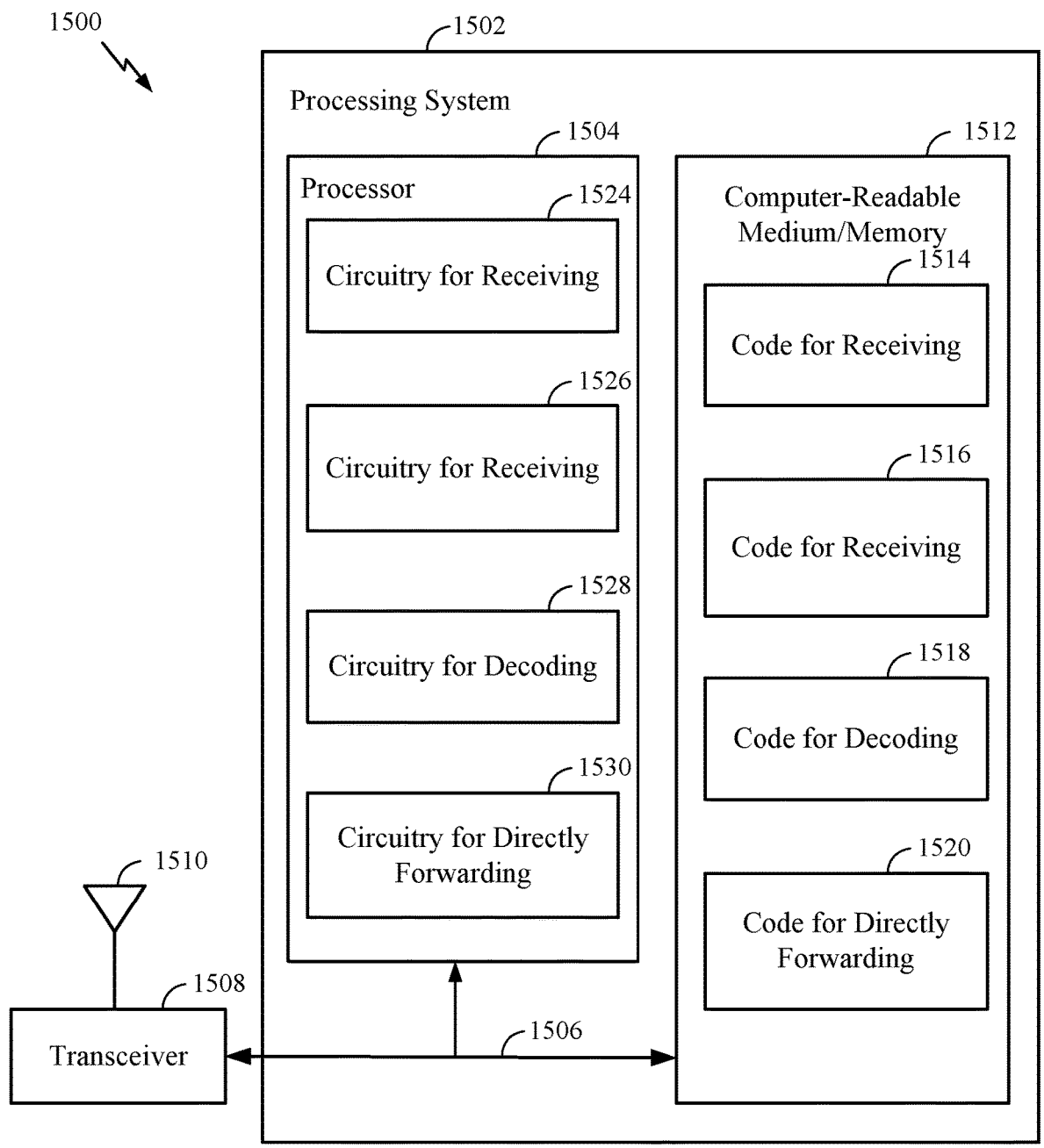
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 10. The communications device 1500 includes a processing system 1502 coupled to a transceiver 1508. The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 10, or other operations for performing the various techniques discussed herein for direct TB forwarding in relaying operations. In certain aspects, computer-readable medium/memory 1512 stores code 1514 for receiving (e.g., for receiving, from a source node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node); code 1516 for receiving (e.g., for receiving, from the source node, control information for one or more data channels configuring one DL grant and two or more SL grants or two or more DL grants and one SL grant); code 1518 for decoding (e.g., for decoding one or more TBs based, at least in part, on the control information); and code 1520 for directly forwarding (e.g., directly forwarding the one or more TBs to the one or more destination nodes based, at least in part, on the indication and the control information). In certain aspects, the processor 1504 has circuitry configured to implement the code stored in the computer-readable medium/memory 1512. The processor 1504 includes circuitry 1524 for receiving (e.g., for receiving, from a source node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node); circuitry 1526 for receiving (e.g., for receiving, from the source node, control information for one or more data channels configuring one DL grant and two or more SL grants or two or more DL grants and one SL grant); circuitry 1528 for decoding (e.g., for decoding one or more TBs based, at least in part, on the control information); and circuitry 1520 for directly forwarding (e.g., directly forwarding the one or more TBs to the one or more destination nodes based, at least in part, on the indication and the control information).

Figure 16:
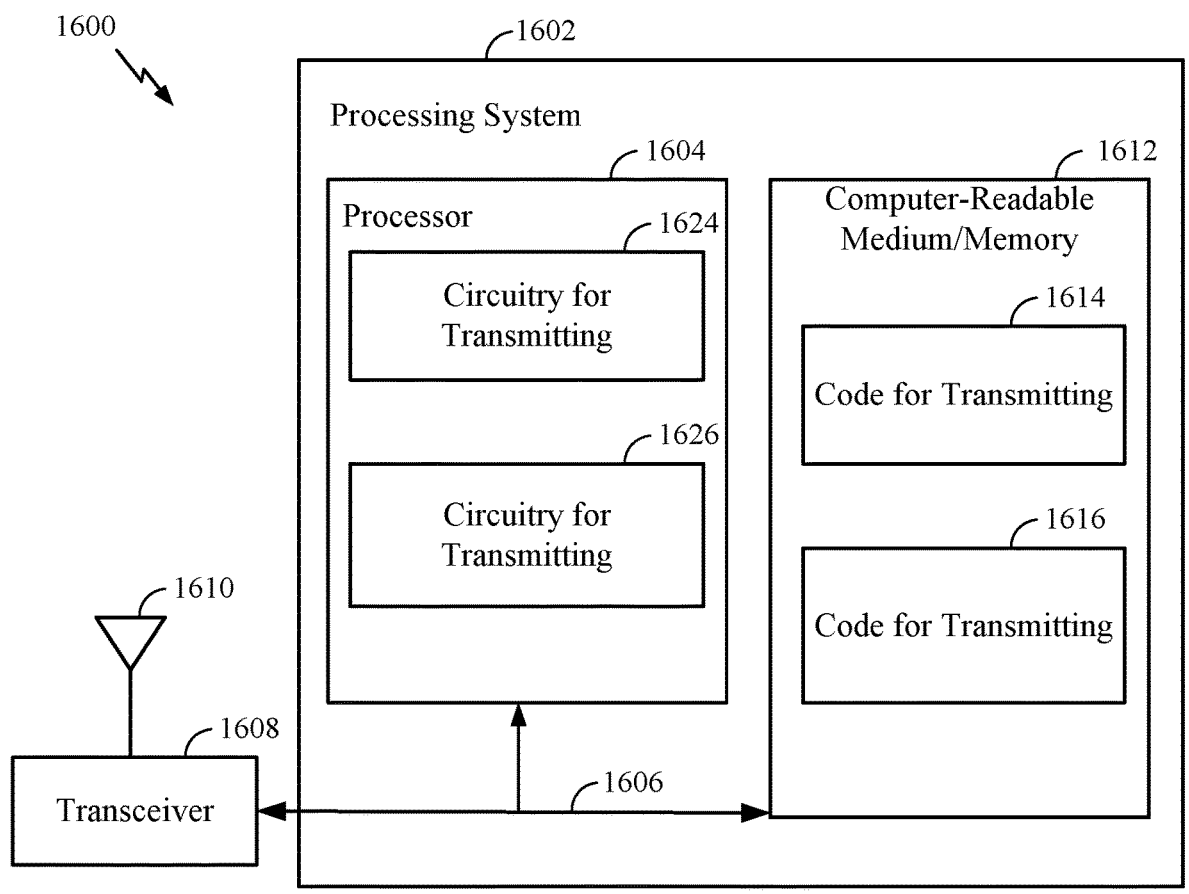
FIG. 16 illustrates a communications device that may include various components configured to perform operations for the techniques disclosed herein in accordance with aspects of the present disclosure.

FIG. 16 illustrates a communications device 1600 that may include various components (e.g., corresponding to means-plus-function components) configured to perform operations for the techniques disclosed herein, such as the operations illustrated in FIG. 11. The communications device 1600 includes a processing system 1602 coupled to a transceiver 1608. The transceiver 1608 is configured to transmit and receive signals for the communications device 1600 via an antenna 1610, such as the various signals as described herein. The processing system 1602 may be configured to perform processing functions for the communications device 1600, including processing signals received and/or to be transmitted by the communications device 1600.

The processing system 1602 includes a processor 1604 coupled to a computer-readable medium/memory 1612 via a bus 1306. In certain aspects, the computer-readable medium/memory 1612 is configured to store instructions (e.g., computer-executable code) that when executed by the processor 1604, cause the processor 1604 to perform the operations illustrated in FIG. 11, or other operations for performing the various techniques discussed herein for direct TB forwarding in relaying operations. In certain aspects, computer-readable medium/memory 1612 stores code 1614 for transmitting (e.g., for transmitting, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node) and code 1616 for transmitting (e.g., for transmitting, to the relay node, control information for one or more data channels configuring one DL grant and two or more SL grants or two DL grants and one SL grant). In certain aspects, the processor 1604 has circuitry configured to implement the code stored in the computer-readable medium/memory 1612. The processor 1604 includes circuitry 1624 for transmitting (e.g., for transmitting, to a relay node, an indication to directly forward one or more TBs to one or more destination nodes, wherein directly forwarding includes transmitting a TB of the one or more TBs to the one or more destination nodes through only a PHY layer and a HARQ portion of a MAC layer in a protocol stack of the relay node) and code 1616 for transmitting (e.g., for transmitting, to the relay node, control information for one or more data channels configuring one DL grant and two or more SL grants or two DL grants and one SL grant).

Example Aspects

Aspect 1: An apparatus for wireless communication by a relay node, comprising a memory and at least one processor coupled to the memory, the least one processor being configured to receive, from a source node, an indication to directly forward one or more transport blocks (TBs) to one or more destination nodes, wherein directly forwarding includes transmitting a TB of the one or more TBs to the one or more destination nodes through only a Physical (PHY) layer and a hybrid automatic repeat request (HARQ) portion of a Media Access Control (MAC) layer in a protocol stack of the relay node, receive, from the source node, control information for one or more data channels configuring one downlink (DL) grant and two or more sidelink (SL) grants or two or more DL grants and one SL grant, decode one or more TBs based, at least in part, on the control information, and directly forward the one or more TBs to the one or more destination nodes based, at least in part, on the indication and the control information.

Aspect 2: The apparatus of Aspect 1, wherein the indication comprises a 1-bit indication in a SL grant or a SL grant portion of a joint DL/SL grant.

Aspect 3: The apparatus of Aspect 1 or 2, wherein the indication is received via radio resource control (RRC) signaling.

Aspect 4: The apparatus of any of Aspects 1-3, wherein the control information comprises one or more identifications (IDs) indicating the one or more destination nodes to which the one or more TBs should be directly forwarded to.

Aspect 5: The apparatus of Aspect 4, wherein the memory and the at least one processor are further configured to: when the control information for the one or more data channels configures one DL grant and two or more SL grants, receive a single TB in accordance with the DL grant, wherein the TB comprises two or more concatenated MAC sub-protocol data units (MAC sub-PDUs) corresponding to two or more IP packets.

Aspect 6: The apparatus of Aspect 5, wherein the control information further configures one or more length fields of the one or more MAC sub-PDUs.

Aspect 7: The apparatus of Aspect 6, wherein the memory and the at least one processor are further configured to: split the TB into the two or more MAC sub-PDUs based, at least in part, on the one or more length fields of the one or more MAC sub-PDUs and directly forward the two or more MAC sub-PDUs to at least two or more destination nodes based, at least in part, on the indication, two or more IDs corresponding to two or more destination nodes, and two or more SL grants corresponding to two or more destination nodes.

Aspect 8: The apparatus of any of Aspects 4-7, wherein the memory and the at least one processor are further configured to: when the control information for the one or more data channels configures two or more DL grants and one SL grant, receive one or more TBs in accordance with one or more of the DL grants, wherein each TB of the one or more received TBs comprises one MAC sub-protocol data unit (MAC sub-PDU) corresponding to a single IP packet.

Aspect 9: The apparatus of Aspect 8, wherein the memory and the at least one processor are further configured to: transmit, to the source node, hybrid automatic repeat request (HARQ) acknowledgement (ACK) feedback for the one or more received TBs, receive, from the source node, the SL grant based, at least in part, on a number of the one or more received TBs at the relay node, concatenate the one or more received TBs in a concatenated TB, and directly forward the concatenated TB to one destination node based, at least in part, on the indication, an ID of the one or more IDs indicating a destination node, and the SL grant.

Aspect 10: The apparatus of Aspect 8 or 9, wherein the configured SL grant comprises one or more SL grants, each corresponding to a separate TB transmitted by the source node, one or more combinations of SL grants, wherein each SL grant corresponds to a separate TB transmitted by the source node, or one or more SL grants corresponding to one or more TBs received by the relay node, the one or more TBs received by the relay node being less than or equal to a number of TBs transmitted by the source node.

Aspect 11: The apparatus of Aspect 10, wherein the memory and the at least one processor are further configured to: select the configured SL grant based, at least in part, on a number of the one or more received TBs, concatenate the one or more received TBs in a concatenated TB, and directly forward the concatenated TB to one destination node based, at least in part, on the indication, an ID of the one or more IDs indicating a destination node, and the selected configured SL grant.

Aspect 12: The apparatus of any of Aspects 1-11, wherein the memory and the at least one processor are further configured to: transmit, to the source node, one or more channel quality indicator (CQI) indices and receive one or more grants for the one or more TBs based, at least in part, on the one or more CQI indices.

Aspect 13: The apparatus of Aspect 12, wherein a CQI index of the one or more CQI indices comprises a SL CQI for a link between the relay node and a destination node of the one or more destination nodes and a grant of the one or more grants for the one or more TBs includes a SL grant based, at least in part, on the CQI index.

Aspect 14: The apparatus of Aspect 12 or 13, wherein a CQI index of the one or more CQI indices comprises a DL CQI for a link between the relay node and the source node and a grant of the one or more grants for the one or more TBs includes a DL grant based, at least in part, on the CQI index.

Aspect 15: An apparatus for wireless communication by a source node, comprising a memory and at least one processor coupled to the memory, the least one processor being configured to transmit, to a relay node, an indication to directly forward one or more transport blocks (TBs) to one or more destination nodes, wherein directly forwarding includes transmitting a TB of the one or more TBs to the one or more destination nodes through only a Physical (PHY) layer and a hybrid automatic repeat request (HARM) portion of a Media Access Control (MAC) layer in a protocol stack of the relay node and transmit, to the relay node, control information for one or more data channels configuring one downlink (DL) grant and two or more sidelink (SL) grants; or two or more DL grants and one SL grant.

Aspect 16: The apparatus of Aspect 15, wherein the indication comprises a 1-bit indication in a SL grant or a SL grant portion of a joint DL/SL grant.

Aspect 17: The apparatus of Aspect 15 or 16, wherein the indication is received via radio resource control (RRC) signaling.

Aspect 18: The apparatus of any of Aspects 15-17, wherein the control information comprises one or more identifications (IDs) indicating the one or more destination nodes to which the one or more TBs should be directly forwarded to.

Aspect 19: The apparatus of Aspect 18, wherein the memory and the at least one processor are further configured to: when the control information for the one or more data channels configures one DL grant and two or more SL grants, transmit a single TB in accordance with the DL grant, wherein the TB comprises two or more concatenated MAC sub-protocol data units (MAC sub-PDUs) corresponding to two or more IP packets.

Aspect 20: The apparatus of Aspect 19, wherein the control information further configures one or more length fields of the one or more MAC sub-PDUs.

Aspect 21: The apparatus of any of Aspects 18-20, wherein the memory and the at least one processor are further configured to: when the control information for the one or more data channels configures two or more DL grants and one SL grant, transmit one or more TBs in accordance with one or more of the DL grants, wherein each TB of the one or more transmitted TBs comprises one MAC sub-protocol data unit (MAC sub-PDU) corresponding to a single IP packet.

Aspect 22: The apparatus of Aspect 21, wherein the memory and the at least one processor are further configured to: receive, from the relay node, hybrid automatic repeat request (HARQ) acknowledgement (ACK) feedback for one or more received TBs at the relay node and transmit, to the relay node, the SL grant based, at least in part, on a number of the one or more received TBs at the relay node.

Aspect 23: The apparatus of Aspect 21 or 22, wherein the configured SL grant comprises one or more SL grants, each corresponding to a separate TB transmitted by the source node, one or more combinations of SL grants, wherein each SL grant corresponds to a separate TB transmitted by the source node, or one or more SL grants corresponding to one or more TBs received by the relay node, the one or more TBs received by the relay node being less than or equal to a number of TBs transmitted by the source node.

Aspect 24: The apparatus of any of Aspects 15-23, wherein the memory and the at least one processor are further configured to: receive, from the source node, one or more channel quality indicator (CQI) indices and transmit one or more grants for the one or more TBs based, at least in part, on the one or more CQI indices.

Aspect 25: The apparatus of Aspect 24, wherein a CQI index of the one or more CQI indices comprises a SL CQI for a link between the relay node and a destination node of the one or more destination nodes and a grant of the one or more grants for the one or more TBs includes a SL grant based, at least in part, on the CQI index.

Aspect 26: The apparatus of Aspect 24 or 25, wherein a CQI index of the one or more CQI indices comprises a DL CQI for a link between the relay node and the source node and a grant of the one or more grants for the one or more TBs includes a DL grant based, at least in part, on the CQI index.

Aspect 27: A method for wireless communication by a relay node, comprising receiving, from a source node, an indication to directly forward one or more transport blocks (TBs) to one or more destination nodes, wherein directly forwarding includes transmitting a TB of the one or more TBs to the one or more destination nodes through only a Physical (PHY) layer and a hybrid automatic repeat request (HARQ) portion of a Media Access Control (MAC) layer in a protocol stack of the relay node, receiving, from the source node, control information for one or more data channels configuring one downlink (DL) grant and two or more sidelink (SL) grants or two or more DL grants and one SL grant, decoding one or more TBs based, at least in part, on the control information; and directly forwarding the one or more TBs to the one or more destination nodes based, at least in part, on the indication and the control information.

Aspect 28: The method of claim 28, wherein the indication comprises a 1-bit indication in a SL grant or a SL grant portion of a joint DL/SL grant.

Aspect 29: A method for wireless communication by a source node, comprising transmitting, to a relay node, an indication to directly forward one or more transport blocks (TBs) to one or more destination nodes, wherein directly forwarding includes transmitting a TB of the one or more TBs to the one or more destination nodes through only a Physical (PHY) layer and a hybrid automatic repeat request (HARM) portion of a Media Access Control (MAC) layer in a protocol stack of the relay node and transmitting, to the relay node, control information for one or more data channels configuring one downlink (DL) grant and two or more sidelink (SL) grants or two or more DL grants and one SL grant.

Aspect 30: The method of claim 29, wherein the indication comprises a 1-bit indication in a SL grant or a SL grant portion of a joint DL/SL grant.

Additional Considerations

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 10 and 11.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above.

The invention claimed is:

1. An apparatus for wireless communication by a relay node, comprising:
 a memory storing computer-executable instructions; and
 at least one processor coupled to the memory, the at least one processor being configured to execute the computer-executable instructions and cause the apparatus to:
  receive, from a source node, an indication to directly forward two or more transport blocks (TBs) to one or more destination nodes, wherein directly forwarding includes transmitting a TB of the two or more TBs to the one or more destination nodes through only a Physical (PHY) layer and a hybrid automatic repeat request (HARQ) portion of a Media Access Control (MAC) layer in a protocol stack of the relay node;

receive, from the source node, control information for one or more data channels configuring two or more downlink (DL) grants, wherein the control information comprises an identification (ID) indicating a destination node, of the one or more destination nodes, to which the two or more TBs should be directly forwarded;

receive two or more of the two or more TBs in accordance with the two or more DL grants, wherein each TB of the two or more received TBs comprises one MAC sub-protocol data unit (MAC sub-PDU) corresponding to a single Internet protocol (IP) packet;

decode the two or more received TBs based, at least in part, on the control information;

transmit, to the source node, hybrid automatic repeat request (HARQ) acknowledgement (ACK) feedback for the two or more received TBs;

receive, from the source node, additional control information configuring a sidelink (SL) grant that is based, at least in part, on a number of the two or more received TBs at the relay node;

concatenate the two or more received TBs in a concatenated TB; and directly forward the concatenated TB to the destination node based, at least in part, on the indication, the ID, and the SL grant.

2. The apparatus of claim 1, wherein the indication comprises a 1-bit indication in a SL grant or a SL grant portion of a joint DL/SL grant.

3. The apparatus of claim 1, wherein the indication is received via radio resource control (RRC) signaling.

4. The apparatus of claim 1, wherein the configured SL grant comprises:
two or more SL grants, each corresponding to a separate TB transmitted by the source node;
one or more combinations of SL grants, wherein each SL grant corresponds to a separate TB transmitted by the source node; or
one or more SL grants corresponding to the two or more TBs received by the relay node, the two or more TBs received by the relay node being less than or equal to a number of TBs transmitted by the source node.

5. The apparatus of claim 4, wherein the at least one processor is configured to execute the computer-executable instructions and further cause the apparatus to:
select the configured SL grant based, at least in part, on a number of the two or more received TBs.

6. The apparatus of claim 1, wherein the at least one processor is configured to execute the computer-executable instructions and further cause the apparatus to:
transmit, to the source node, one or more channel quality indicator (CQI) indices; and
receive one or more grants for the two or more TBs, wherein the one or more grants are based, at least in part, on the one or more CQI indices.

7. The apparatus of claim 6, wherein:
a CQI index of the one or more CQI indices comprises a SL CQI for a link between the relay node and the destination node; and
a grant of the one or more grants for the one or more TBs includes the SL grant that is based, at least in part, on the CQI index.

8. The apparatus of claim 6, wherein:
a CQI index of the one or more CQI indices comprises a DL CQI for a link between the relay node and the source node; and a grant of the one or more grants for the two or more TBs includes one of the two DL grants that is based, at least in part, on the CQI index.

9. An apparatus for wireless communication by a source node, comprising:
a memory storing computer-executable instructions; and
at least one processor coupled to the memory, the at least one processor being configured to execute the computer-executable instructions and cause the apparatus to:
transmit, to a relay node, an indication to directly forward two or more transport blocks (TBs) to one or more destination nodes, wherein directly forwarding includes transmitting a TB of the two or more TBs to the one or more destination nodes through only a Physical (PHY) layer and a hybrid automatic repeat request (HARQ) portion of a Media Access Control (MAC) layer in a protocol stack of the relay node;
transmit, to the relay node, control information for one or more data channels, wherein the control information comprises an identification (ID) indicating a destination node, of the one or more destination nodes, to which the one or more TBs should be directly forwarded, the control information configuring two or more DL grants;
transmit two or more of the two or more TBs in accordance with the two or more DL grants, wherein each TB of the two or more transmitted TBs comprises one MAC sub-protocol data unit (MAC sub-PDU) corresponding to a single Internet protocol (IP) packet;
receive, from the relay node, hybrid automatic repeat request (HARQ) acknowledgement (ACK) feedback for two or more of the two or more transmitted TBs; and
transmit, to the relay node, additional control information configuring a sidelink (SL) grant that is based, at least in part, on a number of the two or more TBs for which the HARQ ACK feedback was received.

10. The apparatus of claim 9, wherein the indication comprises a 1-bit indication in a SL grant or a SL grant portion of a joint DL/SL grant.

11. The apparatus of claim 9, wherein the indication is received via radio resource control (RRC) signaling.

12. The apparatus of claim 9, wherein the configured SL grant comprises:
one or more SL grants, each corresponding to a separate TB transmitted by the source node;
one or more combinations of SL grants, wherein each SL grant corresponds to a separate TB transmitted by the source node; or
one or more SL grants corresponding to the two or more TBs for which the HARQ ACK feedback was received, the two or more TBs for which the HARQ ACK feedback was received being less than or equal to a number of TBs transmitted by the source node.

13. The apparatus of claim 9, wherein the at least one processor is configured to execute the computer-executable instructions and further cause the apparatus to:
receive, from the relay node, one or more channel quality indicator (CQI) indices; and
transmit one or more grants for the two or more TBs based, at least in part, on the one or more CQI indices.

14. The apparatus of claim 13, wherein:
a CQI index of the one or more CQI indices comprises a SL CQI for a link between the relay node and the destination node; and a grant of the one or more grants for the two or more TBs includes a SL grant based, at least in part, on the CQI index.

15. The apparatus of claim 13, wherein:
a CQI index of the one or more CQI indices comprises a DL CQI for a link between the relay node and the source node; and
a grant of the one or more grants for the two or more TBs includes a DL grant based, at least in part, on the CQI index.

16. A method for wireless communication by a relay node, comprising:
receiving, from a source node, an indication to directly forward two or more transport blocks (TBs) to one or more destination nodes, wherein directly forwarding includes transmitting a TB of the two or more TBs to the one or more destination nodes through only a Physical (PHY) layer and a hybrid automatic repeat request (HARQ) portion of a Media Access Control (MAC) layer in a protocol stack of the relay node;
receiving, from the source node, control information for one or more data channels configuring two or more DL grants, wherein the control information comprises an identification (ID) indicating the a destination node, of the one or more destination nodes, to which the two or more TBs should be directly forwarded;
receiving two or more of the two or more TBs in accordance with the two or more DL grants, wherein each TB of the two or more received TBs comprises one MAC sub-protocol data unit (MAC sub-PDU) corresponding to a single Internet protocol (IP) packet;
decoding the two or more received TBs based, at least in part, on the control information;
transmitting, to the source node, hybrid automatic repeat request (HARQ) acknowledgement (ACK) feedback for the two or more received TBs;
receiving, from the source node, additional control information configuring a sidelink (SL) grant that is based, at least in part, on a number of the two or more received TBs at the relay node:
concatenating the two or more received TBs in a concatenated TB; and
directly forwarding the concatenated TB to the destination node based, at least in part, on the indication, the ID, and the SL grant.

17. The method of claim 16, wherein the indication comprises a 1-bit indication in a SL grant or a SL grant portion of a joint DL/SL grant.

18. A method for wireless communication by a source node, comprising:
transmitting, to a relay node, an indication to directly forward two or more transport blocks (TBs) to one or more destination nodes, wherein directly forwarding includes transmitting a TB of the two or more TBs to the one or more destination nodes through only a Physical (PHY) layer and a hybrid automatic repeat request (HARQ) portion of a Media Access Control (MAC) layer in a protocol stack of the relay node;
transmitting, to the relay node, control information for one or more data channels, wherein the control information comprises an identification (ID) indicating a destination node, of the one or more destination nodes, to which the one or more TBs should be directly forwarded, the control information configuring two or more DL grants;
transmitting two or more of the two or more TBs in accordance with the two or more DL grants, wherein each TB of the two or more transmitted TBs comprises one MAC sub-protocol data unit (MAC sub-PDU) corresponding to a single Internet protocol (IP) packet;
receiving, from the relay node, hybrid automatic repeat request (HARQ) acknowledgement (ACK) feedback for two or more of the two or more transmitted TBs; and
transmitting, to the relay node, additional control information configuring a sidelink (SL) grant that is based, at least in part, on a number of the two or more TBs for which the HARQ ACK feedback was received.

19. The method of claim 18, wherein the indication comprises a 1-bit indication in the SL grant or a SL grant portion of a joint DL/SL grant.

* * * * *